(12) United States Patent
Ariel et al.

(10) Patent No.: US 7,917,468 B2
(45) Date of Patent: Mar. 29, 2011

(54) LINKING OF PERSONAL INFORMATION MANAGEMENT DATA

(75) Inventors: Ido Ariel, Tel-Aviv (IL); Robert Paul van Gent, Redwood City, CA (US)

(73) Assignee: Seven Networks, Inc., Redwood City, CA (US)

(*) Notice: Subject to any disclaimer, the term of this patent is extended or adjusted under 35 U.S.C. 154(b) by 0 days.

(21) Appl. No.: 11/229,340

(22) Filed: Sep. 16, 2005

(65) Prior Publication Data

US 2007/0027917 A1 Feb. 1, 2007

Related U.S. Application Data

(63) Continuation-in-part of application No. 11/217,203, filed on Aug. 31, 2005, now Pat. No. 7,853,563.

(60) Provisional application No. 60/704,781, filed on Aug. 1, 2005.

(51) Int. Cl.
*G06F 7/00* (2006.01)
*G06F 17/00* (2006.01)

(52) U.S. Cl. ............. 707/610; 707/624; 707/625

(58) Field of Classification Search ............. 707/104
See application file for complete search history.

(56) References Cited

U.S. PATENT DOCUMENTS

| | | |
|---|---|---|
| 222,458 A | 12/1879 | Connolly et al. |
| 447,918 A | 3/1891 | Strowger |
| 4,200,770 A | 4/1980 | Hellman et al. |
| 4,531,020 A | 7/1985 | Wechselberger et al. |
| 4,807,182 A | 2/1989 | Queen |
| 4,972,457 A | 11/1990 | O'Sullivan |
| 5,008,853 A | 4/1991 | Bly et al. |
| 5,220,657 A | 6/1993 | Bly et al. |
| 5,283,856 A | 2/1994 | Gross et al. |
| 5,392,390 A | 2/1995 | Crozier |
| 5,434,994 A | 7/1995 | Shaheen et al. |
| 5,436,960 A | 7/1995 | Campana, Jr. et al. |
| 5,438,611 A | 8/1995 | Campana, Jr. et al. |
| 5,479,472 A | 12/1995 | Campana, Jr. et al. |
| 5,487,100 A | 1/1996 | Kane |
| 5,493,692 A | 2/1996 | Theimer et al. |
| 5,519,606 A | 5/1996 | Frid-Nielsen et al. |
| 5,555,376 A | 9/1996 | Theimer et al. |
| 5,574,859 A | 11/1996 | Yeh |
| 5,600,834 A | 2/1997 | Howard |
| 5,603,054 A | 2/1997 | Theimer et al. |
| 5,604,788 A | 2/1997 | Tett |
| 5,625,670 A | 4/1997 | Campana, Jr. et al. |
| 5,630,081 A | 5/1997 | Rybicki et al. |
| 5,631,946 A | 5/1997 | Campana, Jr. et al. |
| 5,632,018 A | 5/1997 | Otorii |
| 5,664,207 A | 9/1997 | Crumpler et al. |

(Continued)

OTHER PUBLICATIONS

"The Social Semantic Desktop", by Decker et al., DERI Technical Repor May 2, 2004.*

(Continued)

*Primary Examiner* — Jay A Morrison
(74) *Attorney, Agent, or Firm* — Perkins Coie LLP

(57) ABSTRACT

A system and method for linking information of one user to other users via a data aggregation server is provided. Various security settings govern the linking of information. Various methodologies for initiating a link of PIM data are also provided including automatic linking, targeted linking and requested linking. Implementations utilizing group profiles are also provided.

34 Claims, 6 Drawing Sheets

U.S. PATENT DOCUMENTS

| | | |
|---|---|---|
| 5,666,530 A | 9/1997 | Clark et al. |
| 5,666,553 A | 9/1997 | Crozier |
| 5,684,990 A | 11/1997 | Boothby |
| 5,689,654 A | 11/1997 | Kikinis et al. |
| 5,696,903 A | 12/1997 | Mahany |
| 5,701,423 A | 12/1997 | Crozier |
| 5,706,211 A | 1/1998 | Beletic et al. |
| 5,727,202 A | 3/1998 | Kucala |
| 5,729,735 A | 3/1998 | Meyering |
| 5,742,905 A | 4/1998 | Pepe et al. |
| 5,754,938 A | 5/1998 | Herz et al. |
| 5,758,088 A | 5/1998 | Bezaire et al. |
| 5,758,354 A | 5/1998 | Huang et al. |
| 5,778,346 A | 7/1998 | Frid-Nielsen et al. |
| 5,781,614 A | 7/1998 | Brunson |
| 5,781,901 A | 7/1998 | Kuzma |
| 5,790,790 A | 8/1998 | Smith et al. |
| 5,790,974 A | 8/1998 | Tognazzini |
| 5,794,210 A | 8/1998 | Goldhaber et al. |
| 5,802,312 A | 9/1998 | Lazaridis et al. |
| 5,802,454 A | 9/1998 | Goshay et al. |
| 5,806,074 A | 9/1998 | Souder et al. |
| 5,809,242 A | 9/1998 | Shaw et al. |
| 5,809,415 A | 9/1998 | Rossmann |
| 5,819,172 A | 10/1998 | Campana, Jr. et al. |
| 5,819,274 A | 10/1998 | Jackson, Jr. |
| 5,819,284 A | 10/1998 | Farber et al. |
| 5,826,269 A | 10/1998 | Hussey |
| 5,831,664 A | 11/1998 | Wharton et al. |
| 5,832,489 A | 11/1998 | Kucala |
| 5,838,252 A | 11/1998 | Kikinis |
| 5,838,973 A | 11/1998 | Carpenter-Smith |
| 5,857,201 A | 1/1999 | Wright, Jr. et al. |
| 5,884,323 A | 3/1999 | Hawkins et al. |
| 5,889,845 A | 3/1999 | Staples et al. |
| 5,892,909 A | 4/1999 | Grasso et al. |
| 5,903,723 A | 5/1999 | Beck et al. |
| 5,913,032 A | 6/1999 | Schwartz et al. |
| 5,924,096 A | 7/1999 | Draper et al. |
| 5,928,329 A | 7/1999 | Clark et al. |
| 5,937,161 A | 8/1999 | Mulligan et al. |
| 5,943,676 A | 8/1999 | Boothby |
| 5,948,066 A | 9/1999 | Whalen et al. |
| 5,960,406 A | 9/1999 | Rasansky et al. |
| 5,961,590 A | 10/1999 | Mendez et al. |
| 5,963,642 A | 10/1999 | Goldstein |
| 5,964,833 A | 10/1999 | Kikinis |
| 5,968,131 A | 10/1999 | Mendez et al. |
| 5,974,238 A | 10/1999 | Chase, Jr. |
| 5,974,327 A | 10/1999 | Agrawal et al. |
| 5,978,837 A | 11/1999 | Foladare et al. |
| 5,987,440 A | 11/1999 | O'Neil et al. |
| 6,000,000 A | 12/1999 | Hawkins et al. |
| 6,003,070 A | 12/1999 | Frantz |
| 6,006,274 A | 12/1999 | Hawkins et al. |
| 6,016,478 A | 1/2000 | Zhang et al. |
| 6,018,762 A | 1/2000 | Brunson et al. |
| 6,023,700 A | 2/2000 | Owens et al. |
| 6,023,708 A | 2/2000 | Mendez et al. |
| 6,029,238 A | 2/2000 | Furukawa |
| 6,034,621 A | 3/2000 | Kaufman |
| 6,035,104 A | 3/2000 | Zahariev |
| 6,052,563 A | 4/2000 | Macko |
| 6,052,735 A | 4/2000 | Ulrich et al. |
| 6,073,138 A | 6/2000 | de l'Etraz et al. |
| 6,073,142 A | 6/2000 | Geiger et al. |
| 6,073,165 A | 6/2000 | Narasimhan et al. |
| 6,085,166 A | 7/2000 | Beckhardt et al. |
| 6,085,192 A | 7/2000 | Mendez et al. |
| 6,088,677 A | 7/2000 | Spurgeon |
| 6,101,320 A | 8/2000 | Schuetze et al. |
| 6,101,480 A | 8/2000 | Conmy et al. |
| 6,101,531 A | 8/2000 | Eggleston et al. |
| 6,112,181 A | 8/2000 | Shear et al. |
| 6,119,014 A | 9/2000 | Alperovich et al. |
| 6,125,369 A | 9/2000 | Wu et al. |
| 6,125,388 A | 9/2000 | Reisman |
| 6,131,116 A | 10/2000 | Riggins et al. |
| 6,134,432 A | 10/2000 | Holmes et al. |
| 6,138,128 A | 10/2000 | Perkowitz et al. |
| 6,138,146 A | 10/2000 | Moon et al. |
| 6,141,664 A | 10/2000 | Boothby |
| 6,157,630 A | 12/2000 | Adler et al. |
| 6,161,140 A | 12/2000 | Moriya |
| 6,167,379 A | 12/2000 | Dean et al. |
| 6,175,831 B1 | 1/2001 | Weinreich et al. |
| 6,195,533 B1 | 2/2001 | Tkatch et al. |
| 6,198,696 B1 | 3/2001 | Korpi |
| 6,201,469 B1 | 3/2001 | Balch et al. |
| 6,202,085 B1 | 3/2001 | Benson et al. |
| 6,205,448 B1 | 3/2001 | Kruglikov et al. |
| 6,219,694 B1 | 4/2001 | Lazaridis et al. |
| 6,221,877 B1 | 4/2001 | Aronov et al. |
| 6,243,705 B1 | 6/2001 | Kucala |
| 6,246,875 B1 | 6/2001 | Seazholtz et al. |
| 6,247,135 B1 | 6/2001 | Feague |
| 6,256,666 B1 | 7/2001 | Singhai |
| 6,263,201 B1 | 7/2001 | Hashimoto et al. |
| 6,263,340 B1 | 7/2001 | Green |
| 6,269,369 B1 | 7/2001 | Robertson |
| 6,272,545 B1 | 8/2001 | Flanagin et al. |
| 6,275,850 B1 | 8/2001 | Beyda et al. |
| 6,289,212 B1 | 9/2001 | Stein et al. |
| 6,292,904 B1 | 9/2001 | Broomhall et al. |
| 6,295,541 B1 | 9/2001 | Bodnar et al. |
| 6,304,881 B1 | 10/2001 | Halim et al. |
| 6,308,201 B1 | 10/2001 | Pivowar et al. |
| 6,317,594 B1 | 11/2001 | Grossman et al. |
| 6,324,541 B1 | 11/2001 | de l'Etraz et al. |
| 6,324,542 B1 | 11/2001 | Wright, Jr. et al. |
| 6,324,544 B1 | 11/2001 | Alam et al. |
| 6,324,587 B1 | 11/2001 | Trenbeath et al. |
| 6,327,586 B1 | 12/2001 | Kisiel |
| 6,356,937 B1 | 3/2002 | Montville et al. |
| 6,363,352 B1 | 3/2002 | Dailey et al. |
| 6,370,566 B2 | 4/2002 | Discolo et al. |
| 6,380,959 B1 | 4/2002 | Wang et al. |
| 6,389,455 B1 | 5/2002 | Fuisz |
| 6,389,457 B2 | 5/2002 | Lazaridis et al. |
| 6,401,104 B1 | 6/2002 | LaRue et al. |
| 6,401,112 B1 | 6/2002 | Boyer et al. |
| 6,401,113 B2 | 6/2002 | Lazaridis et al. |
| 6,405,197 B2 | 6/2002 | Gilmour |
| 6,415,031 B1 | 7/2002 | Colligan et al. |
| 6,421,669 B1 | 7/2002 | Gilmour et al. |
| 6,421,781 B1 | 7/2002 | Fox et al. |
| 6,438,585 B2 | 8/2002 | Mousseau et al. |
| 6,442,589 B1 | 8/2002 | Takahashi et al. |
| 6,442,637 B1 | 8/2002 | Hawkins et al. |
| 6,446,118 B1 | 9/2002 | Gottlieb |
| 6,463,463 B1 | 10/2002 | Godfrey et al. |
| 6,463,464 B1 | 10/2002 | Lazaridis et al. |
| 6,487,557 B1 | 11/2002 | Nagatomo |
| 6,487,560 B1 | 11/2002 | LaRue et al. |
| 6,490,353 B1 | 12/2002 | Tan |
| 6,505,214 B1 | 1/2003 | Sherman et al. |
| 6,516,327 B1 | 2/2003 | Zondervan et al. |
| 6,526,506 B1 | 2/2003 | Lewis |
| 6,529,908 B1 | 3/2003 | Piett et al. |
| 6,546,005 B1 | 4/2003 | Berkley et al. |
| 6,549,939 B1 | 4/2003 | Ford et al. |
| 6,618,710 B1 | 9/2003 | Zondervan et al. |
| 6,639,693 B1 | 10/2003 | Ejiri et al. |
| 6,643,688 B1 | 11/2003 | Fuisz |
| 6,647,384 B2 | 11/2003 | Gilmour |
| 6,671,700 B1 | 12/2003 | Creemer et al. |
| 6,671,702 B2 | 12/2003 | Kruglikov et al. |
| 6,671,757 B1 * | 12/2003 | Multer et al. ................. 710/100 |
| 6,694,336 B1 | 2/2004 | Multer et al. |
| 6,697,807 B2 | 2/2004 | McGeachie |
| 6,701,378 B1 | 3/2004 | Gilhuly et al. |
| 6,708,221 B1 | 3/2004 | Mendez et al. |
| 6,714,965 B2 | 3/2004 | Kakuta et al. |
| 6,721,787 B1 | 4/2004 | Hiscock |
| 6,728,530 B1 | 4/2004 | Heinonen et al. |
| 6,728,786 B2 | 4/2004 | Hawkins et al. |
| 6,735,591 B2 | 5/2004 | Khan |

| | | |
|---|---|---|
| 6,741,855 B1 | 5/2004 | Martin et al. |
| 6,757,362 B1 | 6/2004 | Cooper et al. |
| 6,757,696 B2 | 6/2004 | Multer et al. |
| 6,779,019 B1 | 8/2004 | Mousseau et al. |
| 6,782,409 B1 | 8/2004 | Yoshida |
| 6,785,868 B1 | 8/2004 | Raff |
| 6,785,906 B1 | 8/2004 | Gaughan et al. |
| 6,804,707 B1 | 10/2004 | Ronning |
| 6,816,849 B1 | 11/2004 | Halt, Jr. |
| 6,820,088 B1 | 11/2004 | Hind et al. |
| 6,820,204 B1 | 11/2004 | Desai et al. |
| 6,847,974 B2 | 1/2005 | Wachtel |
| 6,850,757 B2 | 2/2005 | Watanabe et al. |
| 6,859,212 B2 | 2/2005 | Kumar et al. |
| 6,871,220 B1 | 3/2005 | Rajan et al. |
| 6,879,985 B2 | 4/2005 | Deguchi et al. |
| 6,892,070 B2 | 5/2005 | Warrier et al. |
| 6,892,196 B1 | 5/2005 | Hughes |
| 6,895,558 B1 | 5/2005 | Loveland |
| 6,898,427 B1 | 5/2005 | Griffith et al. |
| 6,922,721 B1 | 7/2005 | Minborg et al. |
| 6,970,879 B1 | 11/2005 | Gilmour |
| 6,973,299 B2 | 12/2005 | Apfel |
| 7,047,202 B2 | 5/2006 | Jaipuria et al. |
| 7,069,308 B2 | 6/2006 | Abrams |
| 7,120,928 B2 | 10/2006 | Sheth |
| 7,139,555 B2 | 11/2006 | Apfel |
| 7,206,806 B2 * | 4/2007 | Pineau ........................... 709/203 |
| 7,289,971 B1 * | 10/2007 | O'Neil et al. ................... 705/44 |
| 7,461,071 B2 | 12/2008 | Fitzpatrick |
| 7,539,665 B2 | 5/2009 | Mendez |
| 2001/0023414 A1 | 9/2001 | Kumar et al. |
| 2001/0032254 A1 | 10/2001 | Hawkins |
| 2001/0043148 A1 | 11/2001 | Stewart |
| 2002/0002478 A1 | 1/2002 | Swart et al. |
| 2002/0035556 A1 | 3/2002 | Shah et al. |
| 2002/0049828 A1 * | 4/2002 | Pekarek-Kostka ............ 709/217 |
| 2002/0059201 A1 * | 5/2002 | Work ............................... 707/3 |
| 2002/0059457 A1 | 5/2002 | Ballard et al. |
| 2002/0068559 A1 | 6/2002 | Sharma et al. |
| 2002/0077077 A1 | 6/2002 | Rezvani et al. |
| 2002/0095319 A1 | 7/2002 | Swart et al. |
| 2002/0095328 A1 | 7/2002 | Swart et al. |
| 2002/0095391 A1 | 7/2002 | Swart et al. |
| 2002/0099613 A1 | 7/2002 | Swart et al. |
| 2002/0120766 A1 | 8/2002 | Okajima et al. |
| 2002/0133504 A1 | 9/2002 | Vlahos et al. |
| 2002/0146129 A1 | 10/2002 | Kaplan |
| 2002/0161925 A1 | 10/2002 | Munger et al. |
| 2002/0186848 A1 | 12/2002 | Shaik |
| 2002/0194209 A1 | 12/2002 | Bolosky et al. |
| 2003/0005151 A1 | 1/2003 | Ullman et al. |
| 2003/0100326 A1 | 5/2003 | Grube et al. |
| 2003/0130984 A1 | 7/2003 | Quinlan et al. |
| 2003/0154212 A1 | 8/2003 | Schirmer et al. |
| 2003/0157947 A1 | 8/2003 | Fiatal et al. |
| 2003/0208559 A1 | 11/2003 | Velline et al. |
| 2003/0217098 A1 | 11/2003 | Bobde et al. |
| 2003/0217142 A1 | 11/2003 | Bobde |
| 2003/0235308 A1 | 12/2003 | Boynton et al. |
| 2004/0024795 A1 | 2/2004 | Hind et al. |
| 2004/0024892 A1 | 2/2004 | Creswell et al. |
| 2004/0103147 A1 | 5/2004 | Flesher et al. |
| 2004/0172481 A1 | 9/2004 | Engstrom |
| 2004/0186902 A1 | 9/2004 | Stewart |
| 2004/0199497 A1 | 10/2004 | Timmons |
| 2004/0236792 A1 | 11/2004 | Celik |
| 2005/0021750 A1 * | 1/2005 | Abrams ........................ 709/225 |
| 2005/0027716 A1 | 2/2005 | Apfel |
| 2005/0041793 A1 | 2/2005 | Fulton |
| 2005/0044144 A1 | 2/2005 | Malik et al. |
| 2005/0102257 A1 | 5/2005 | Onyon |
| 2005/0102328 A1 | 5/2005 | Ring |
| 2005/0108427 A1 | 5/2005 | van Dalta |
| 2005/0117606 A1 * | 6/2005 | Kim ................................ 370/473 |
| 2005/0120084 A1 * | 6/2005 | Hu et al. ........................ 709/206 |
| 2005/0144219 A1 | 6/2005 | Terada |
| 2005/0154796 A1 | 7/2005 | Forsyth |
| 2005/0193036 A1 | 9/2005 | Phillips et al. |
| 2005/0228812 A1 | 10/2005 | Hansmann et al. |
| 2005/0278307 A1 | 12/2005 | Battagin et al. |
| 2005/0288006 A1 | 12/2005 | Apfel |
| 2006/0020580 A1 | 1/2006 | Dettinger et al. |
| 2006/0020804 A1 * | 1/2006 | Schleifer et al. .............. 713/176 |
| 2006/0031114 A1 | 2/2006 | Zommers |
| 2006/0052091 A1 * | 3/2006 | Onyon et al. .................. 455/415 |
| 2006/0069686 A1 | 3/2006 | Beyda et al. |
| 2006/0143464 A1 | 6/2006 | Ananthanarayanan et al. |
| 2006/0190428 A1 | 8/2006 | Jung et al. |
| 2006/0242210 A1 | 10/2006 | Ring |
| 2006/0294071 A1 | 12/2006 | Weare et al. |
| 2007/0027886 A1 | 2/2007 | Gent |
| 2007/0027917 A1 | 2/2007 | Ariel |
| 2007/0027920 A1 | 2/2007 | Alvarado |
| 2007/0027921 A1 | 2/2007 | Alvarado |
| 2007/0027930 A1 | 2/2007 | Alvarado |
| 2007/0130108 A1 | 6/2007 | Simpson, Jr. |
| 2007/0130217 A1 | 6/2007 | Linyard |
| 2007/0174433 A1 | 7/2007 | Mendez |
| 2007/0250591 A1 | 10/2007 | Milic-Frayling |
| 2008/0133641 A1 | 6/2008 | Gent |
| 2008/0134292 A1 | 6/2008 | Ariel |
| 2008/0140665 A1 | 6/2008 | Ariel |
| 2009/0119266 A1 | 5/2009 | Fitzpatrick |
| 2009/0125523 A1 | 5/2009 | Fitzpatrick |
| 2009/0144632 A1 | 6/2009 | Mendez |

OTHER PUBLICATIONS

"A Multi-Dimensional, Unified User Model for Cross-System Personalization", by Niederee et al., AVI'04, May 25, 2004, Gallipoli, Italy.*

Milgram, Stanley, "The Small-World Problem," Psychology Today (1967), pp. 60-67.

Kleinberg, Jon, "The Small-World Phenomenon: An Algorithmic Perspective," Cornell Computer Science Technical Report (1999).

Phillips, Joshua et al., "Modeling the Intelligence Analysis Process for Intelligent User Agent Development," Research and Practice in Human Resource Management 9(1), 59-73.

Microsoft Computer Dictionary (5th Ed.): synchronization.

Microsoft Computer Dictionary (5th Ed.): access.

Lotus NotesPump Miscellaneous Paper (date unknown).

NotesPump 1.0 Release Notes (date unknown).

Lotus Notes-Notes Administration Help Screen Shot (Date Unknown).

Chapter 13-1, "Anatomy of a Note ID," (date unknown).

About NotesPump (date unknown).

Lotus Development Corporation, "Lotus Quick Reference for SmartIcons, Lotus Notes Release 3.1," (date unknown).

Lotus Development Corporation, "Lotus Quick Reference for Windows and Presentation Manager, Lotus Notes Release 3," (date unknown).

Lotus Development Corporation, "Lotus Quick Reference for Macintosh, Lotus Notes Release 3.0," (date unknown).

Lotus. Development Corporation, "Lotus Quick Reference for Application Developers, Lotus Notes Release 3," (date unknown).

Lotus Development Corporation, "Lotus Customer Support Service,•Lotus Notes Customer Support Guides," (date unknown).

Lotus Software Agreement for "Notes 4.0 NA DKTP Client UPG," Part No. 38985, (date unknown).

Lotus Development Corporation, Lotus Notes 4.0, "Lotus Customer Support, North American Guide," (date unknown).

Lotus Development Corporation, Lotus Notes 4.1 Starter Pack, "Lotus Customer Support, North American Guide," (date unknown).

Lotus Development Corporation, "LotusScript Classes for Notes Release 4," (date unknown).

Allchin, James E., "An Architecture for Reliable Decentralized Systems," UMI Dissertation Services, Copyright 1983.

Lotus Development Corporation, "Lotus Notes Release 3.1: The Groupware Standard, Administrator's Guide—Server for NetWare, OS/2, and UNIX," 1989.

Lotus Development Corporation, "Lotus Notes Release 3.1: The Groupware Standard, Site and Systems Planning Guide," 1991.

Wilcox, Adam A., "PC Learning Labs Teaches Lotus Notes 3.0: The Quick and Easy Way to Learn," Ziff-Davis Press, 1993.
Lotus Development Corporation, "Lotus Notes Release 3.3: Start Here, Workstation Install for Windows, OS/2 and Macintosh," 1993.
Augun, Audry, "Integrating Lotus Notes with Enterprise Data," "Lotus Notes Advisor," Advisor Publications, Jul. /Aug. 1996, pp. 22-25.
"Lotus Notes Advisor," Advisor Publications, Aug. 1996.
IBM Corporation, "Secrets to Running Lotus Notes: The Decisions No One Tells You How to Make," Oct. 1996.
"Lotus Notes Advisor," Advisor Publications, Oct. 1996.
Opyt, Barbara, et al., "Use the Internet as Your Lotus Notes WAN," "Lotus Notes Advisor," Advisor Publications, Nov./Dec. 1996, pp. 17-20.
"Lotus Notes Advisor," Advisor Publications, Dec. 1996.
Swedeen, Bret, et al., "Under the Microscope: Domino Replication," "LDD Today," Oct. 1, 1998.
Lotus Development Corporation, "Lotus Inside Notes: The Architecture of Notes and the Domino Server," 2000.
"The History of Notes and Domino," Lotus Developer Domain, Lotus, Sep. 29, 2003.
Federal Information Processing Standards Publication 180-2, Aug. 1, 2002.
Federal Information Processing Standards Publication 197, Nov. 26, 2001.
Lotus Development Corporation, "Lotus Notes Release 3.1: Administrator's Guide—Server for Windows," 1993.
Lotus Development Corporation, "Lotus Notes Release 3.1: The Groupware Standard, Customer Services Application Guide," 1994.
Lotus Development Corporation, "Lotus Notes Release 3.1: The Groupware Standard, Getting Started with Application Development," 1994.
Lotus Development Corporation, "Lotus Notes Release 3.1: The Groupware Standard, Network Driver Documentation," 1994.
Kornblith, Polly R., "Lotus Notes Answers: Certified Tech Support," Covers Lotus Notes Release 3, Osborne McGraw-Hill, 1994.
Freeland, Pat and Londergan, Stephen, "Lotus Notes 3/3.1 for Dummies (TM)," IDG Books Worldwide, 1994.
Gewirtz, David, "Lotus Notes 3 Revealed! Your Guide to Managing Information and Improving Communication Throughout Your Organization," Prima Publishing, 1994.
Shafran, Andrew B., "Easy Lotus Notes for Windows (TM)," Que (R) Corporation, 1994.
Lotus Development Corporation, "Lotus Notes Release 3.3: The Groupware Standard, Administration," 1994.
McMullen, Melanie, Editor, "Network Remote Access and Mobile Computing," Miller Freeman Inc., 1994.
Lotus Development Corporation, "Lotus Notes Internet Cookbook for Notes Release 3," Jan. 16, 1996.
Wong, Harry, "Casahl's Replic-Action: Delivering True Notes/DBMS Integration," "The View Technical Journal for Lotus Notes(R) Software," vol. 2, Issue 1, Jan./Feb. 1996, pp. 33-50.
"Lotus Notes Advisor," Advisor Publications, Jan./Feb. 1996.
IBM International Technical Support Organization, "Lotus Notes Release 4 in a Multiplatform Environment," Feb. 1996.
Lotus Development Corporation,"Lotus Notes Internet Cookbook for Notes Release 4," Feb. 14, 1996.
Blaney, Jeff, "You Can Take it with you: An Introduction to Mobile Computing with Notes R4," "The View Technical Journal for Lotus Notes(R) Software," vol. 2, Issue 1, Jan./Feb. 1996, pp. 22-32.
"Lotus Notes Advisor," Advisor Publications, Apr. 1996.
Frenkel, Garry, "Pumping for Info: Notes and Database Integration," "Network Computing," May 1, 1996, pp. 76-84.
Lotus Development Corporation, "Lotus Notes Knowledge Base," "Firewall Security Overview and How Firewalls Relate to Lotus Notes," May 22, 1996.
"Lotus Notes Advisor," Advisor Publications, Jun. 1996.
IntelliLink Corporation, "IntelliLink (R) for Windows User's Guide," Version 3.0, 1994.
Lotus Development Corporation, "Lotus Notes Release 4: InterNotes Web Navigator Administrator's Guide," 1995.
Lotus Development Corporation, "Lotus InterNotes Release 4 Web Publisher: InterNotes Web Publisher Guide," 1995.
Lotus Development Corporation, "Lotus Notes Release 4 Install Guide for Servers," 1995.
Lotus Development Corporation, "Lotus Notes Release 4.1 Release Notes," 1995.
Lotus Development Corporation, "Lotus Notes Release 4 Migration Guide," 1995.
Lotus Development Corporation, "Lotus Notes Release 4 Database Manager's Guide," 1995.
Lotus Development Corporation, "Lotus Notes Release 4 Install Guide for Workstations," 1995.
Lotus Development Corporation, "Lotus Step by Step: A Beginner's Guide to Lotus Notes," 1995.
Lotus Development Corporation, "Lotus Notes Release 4.5, Network Configuration Guide," 1995.
Netscape Communications Corporation, "Installation Guide, Netscape Mail Server, Version 2.0 for Unix," 1995.
Netscape Communications Corporation, "User's Guide, Netscape Mail Server, Version 2.0," 1995.
Netscape Communciations Corporation, "Administrator's Guide, Netscape Mail Server, Version 2.0," 1995.
Pyle, Hugh, "The Architecture of Lotus Notes," Lotus Notes Advisor, Advisor Publications, Premiere Issue 1995, pp. 18-27.
"Lotus Notes Advisor," Advisor Publications, Jun. 1995.
IBM, "The Architecture of Lotus Notes," White Paper, No. 114654, modified date: May 31, 1995.
Lotus Development Corporation, "Lotus Notes Knowledge Base," "What is the Notes Replicator," Jul. 5, 1995.
"Lotus Notes Advisor," Advisor Publications, Aug. 1995.
Grous, Paul J., "Creating an Managing a Web Site with Lotus' InterNotes Web Publisher," "The View Technical Journal for Lotus Notes (R) Software," vol. 1, Issue 4, Sep./Oct. 1995, pp. 3-18.
"Lotus Notes Advisor," Advisor Publications, Oct. 1995.
Cole, Barb, "Lotus airs Notes-to-database integration tool," www.looksmart.com, Oct. 2, 1995.
Lotus Development Corporation, "Lotus Notes Knowledge Base," "Lotus Announces Lotus NotesPump 1.0," Oct. 31, 1995.
Lotus Development Corporation, "Lotus Notes Knowledge Base," Lotus NotesPump 1.0 Q & A, Oct. 31, 1995.
Lotus Development Corporation, Lotus Notes Knowledge Base, "Lotus NotesPump: Database Integration for Lotus Notes," Oct. 31, 1995.
Lotus Development Corporation, "Lotus Notes Knowledge Base," "How to Set Up "Firewall" Protection for a Notes Domain," Nov. 6, 1995.
Pyle, Lisa, "A Jump Start to the Top Ten R3-to-R4 Migration Considerations," "Lotus Notes Advisor," Advisor Publications, vol. 1, No. 5, Nov./Dec. 1995, pp. 3-20.
"Lotus Notes Advisor," Advisor Publications, Dec. 1995.
Lotus Development Corporation, "Lotus Notes Release 4 Install Guide for Workstations," First Revision, 1996.
Lotus Development Corporation, "Lotus Notes Release 4 Programmer's Guide Part 1," 1995.
Lotus Development Corporation, Lotus Notes Release 4 Programmer's Guide Part 2, 1995.
Lotus Development Corporation, "Lotus Notes Release 4 Administrator's Guide," 1995.
Lotus Development Corporation, "Lotus Notes Release 4 Deployment Guide," 1995.
Lotus Development Corporation, "Lotus Notes. Release 4 Application Developer's Guide," 1995.
Lotus Development Corporation, "Lotus Notes Release 4 InterNotes Web Navigator User's Guide," 1995.
Lotus Development Corporation, "Lotus Notes Release 4 Release Notes," 1995.
Lotus Development Corporation, "Lotus Notes Release 4.5 Install Guide for Workstations," 1995.
Lotus Development Corporation, "Release Notes, Lotus Notes Release 3.30, Windows, OS/2, and Macintosh," 1995.
Brown, Kevin, et al., "Mastering Lotus(R) Notes (R)," SYBEX Inc., 1995.
Lotus Development Corporation, "Lotus Step by Step: A Beginner's Guide to Lotus Notes," First Revision, 1996.

Freeland, Pat and Londergan, Stephen, "Lotus Notes Release 4 for Dummies(TM)," IDG Books Worldwide, 1996.

Kreisle, Bill, "Teach yourself . . . Lotus Notes 4," MIS:Press, 1996.

Marmel, Elain, "Easy Lotus(R) Notes Release 4.0," Que Corporation, 1996.

Lotus Development Corporation, "Lotus Notes Server Up and Running!, Release 4," 1996.

Falkner, Mike, "How to Plan, Develop and Implement Lotus Notes in Your Organization," Wiley Computer Publishing, John Wiley and Sons., Inc., 1996.

Lamb, John P., et al., "Lotus Notes Network Design," McGraw-Hill, 1996.

Tamura, Randall A., et al., "Lotus Notes 4 Unleashed," Sams Publishing, 1996.

Dahl, Andrew, "Lotus Notes 4 Administrator's Survival Guide," Sams Publishing, 1996.

Netscape Communications Corporation, "Administrator's Guide, Netscape News Server, Version 2.0," 1996.

Bedell, Doug, "I Know Someone Who Knows Kevin Bacon: Meeting Your New Best Friends; Six Degrees Widens Your Contacts . . . " Dallas Morning News, Oct. 27, 1998.

Andriana Vivacqua, et al., "Profiling and Matchmaking Strategies in Support of Opportunistic Collaboration," Conference on Cooperative Information Systems, Nov. 3-7, 2003.

* cited by examiner

LINKING OF PERSONAL INFORMATION MANAGEMENT DATA

CROSS-REFERENCE TO RELATED APPLICATIONS

The present application is a continuation-in-part and claims the priority benefit of U.S. patent application Ser. No. 11/217,203 filed Aug. 31, 2005 now U.S. Pat. No. 7,853,563 and entitled "Universal Data Aggregation," which claims the priority benefit of U.S. provisional patent application No. 60/704,781 filed Aug. 1, 2005 and entitled "Networked Personal Information Management," the disclosure of these commonly owned applications is incorporated herein by reference. The present application is related to U.S. patent application Ser. No. 10/339,368 filed Jan. 8, 2003 and entitled "Connection Architecture for a Mobile Network." The present application is also related to U.S. patent application Ser. No. 10/339,369 filed Jan. 8, 2003 and entitled "Secure Transport for Mobile Communication Network." The related applications are commonly owned and are incorporated herein by reference.

BACKGROUND OF THE INVENTION

1. Field of the Invention

The present invention relates to control and utilization of Personal Information Management (PIM) data such as calendar and contact information in the context of personal and professional activities. More specifically, the present invention relates to the sharing and updating of PIM data amongst various users and information stores.

2. Description of Related Art

Despite personal computing coming to fruition only in the latter quarter of the twentieth century, PIM data has existed in various forms and has been utilized as early as the commercial introduction of the telephone in the late 1800s.

For example, early telephone switching technology required a manual switchboard where all telephone lines in a local area terminated. At the terminal points, plugs were installed so that two lines could be connected to one another. When a customer placed a call, an operator would receive the placed call and inquire as to whom the caller was attempting to reach. The operator would then connect the caller and the callee. Identifying information relating to the telephone lines of the caller and callee constituted a primitive form of PIM data in that this identifying information provided a point of contact like modern-day contact information such as a telephone numbers or electronic mail addresses.

Examples more recent than the telephone switching operator's index of telephone lines abound. For example, the wall calendar or desktop organizer has been a common means of tracking appointments, deadlines and performing scheduling. Day planners and personal organizers have also been a main stay of the business world. One of the earliest providers of day planners—Day-Timers, Inc.—began producing a time record book of calendar pages combining the functions of an appointment book, a reminder system, a detailed time record and work planner in 1947 called the 'Lawyer's Day.' These various organizers were lacking, however, in that they were either non-portable (e.g., desktop organizers or wall calendars) or were bulky and filled with a wide (and often scattered and disorganized) array of notes, reminders and memos.

With the aforementioned dawn of the personal computing age, computing devices quickly became smaller, more personable and financially accessible to the average consumer. Personal Digital Assistants (PDAs) like those operating on the Palm-OS® quickly became pervasive starting with the release of the Pilot 1000 in 1996. Affectionately known as PalmPilots, these PDAs and other similar portable devices offered a digital means to keep track of calendar information (e.g., meetings and availability for other appointments), contact information (e.g., names, addresses, phone numbers and email addresses) in addition to to-do lists, personal notes and so on. PDAs were advantageous in that they were portable, did not require the use of paper and, as a result of their design, forced certain degrees of organization that might not otherwise be present in a traditional day planner.

As the business environment became more interactive, there became an increased need to share information. As most business relationships are the result of networking and referrals, access to contact information of certain persons became more critical. The Palm III PDA recognized the need to share such information. The Palm III, which was released in 1998, included an InfraRed (IR) port in its hardware construction. Applications bundled within the Palm III would support data exchange over IR in accordance with InfraRed Data Association (IrDA) standards. Through the use of IR data protocols, the Palm III enabled Palm-to-Palm communications and data sharing including the exchange of PIM data.

Notwithstanding the ability to share PIM data through an IR port like that in the Palm III, the physical range of data exchanges was extremely limited—often no more than five feet. In today's business environment, it is not uncommon for business professionals to conduct business from around the globe. It is, perhaps, more uncommon for business professionals to conduct business transactions face-to-face much less within five feet of one another. Even with e-mail, facsimile, courier and express mail services, if business professionals happen to be in different time zones—or on different sides of the date line—the exchange of data can be delayed by several hours. Hours can often mean the difference between closing a deal or losing that deal to a possible competitor.

There is a need in the art to exchange PIM and other data regardless of temporal or geographic distances amongst individuals and business professionals.

There is also a need in the art to create more complete stores of PIM data wherein partial or incomplete PIM records can be updated or completed through the recognition of and access to various other PIM data records and sources.

SUMMARY OF THE INVENTION

The present invention advantageously provides a system and method for creating and copying PIM and other data to client devices.

The present invention also provides a system and method for updating PIM data amongst a plurality of users and providers of PIM data.

The present invention further provides a system and method for identifying relationships amongst different users based on PIM data.

The present invention provides a system and method for creating links between different users based on commonalities and relationships as evidenced in PIM data wherein PIM data may be shared and updated.

The present invention further provides a system and method for assigning security limitations amongst different users of PIM data.

DETAILED DESCRIPTION OF AN EXEMPLARY EMBODIMENT

Figure 1:
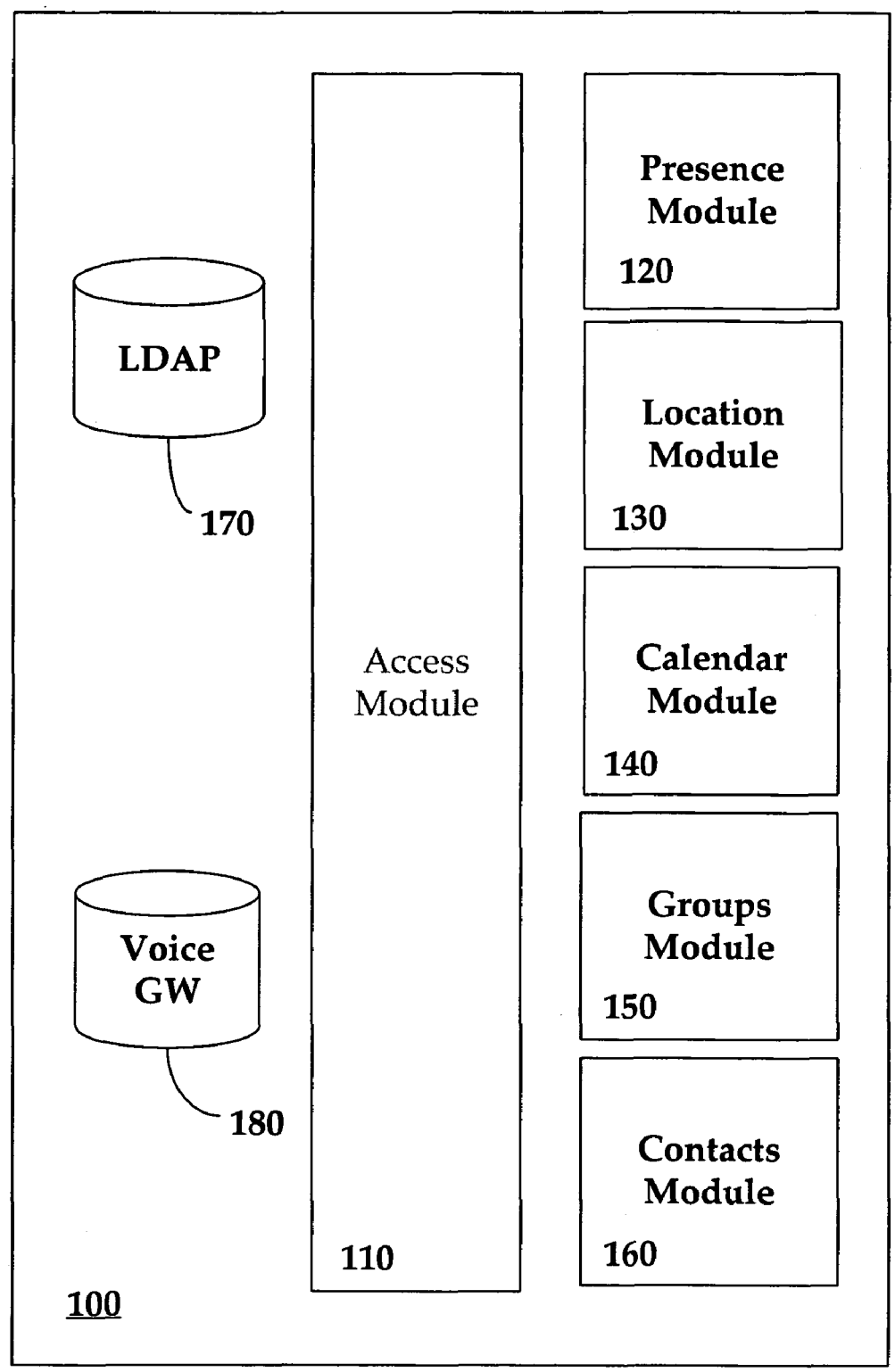
FIG. 1 is an exemplary data aggregation server providing for aggregation and management of PIM data.

FIG. 1 is an exemplary data aggregation server 100 providing for the aggregation and management PIM data such as personal and professional contact and calendar information. An exemplary use of data aggregation server 100 to acquire and parse PIM data is described in U.S. patent application Ser. No. 11/217,203 entitled "Universal Data Aggregation," which has been incorporated herein by reference.

A module, as referenced in the present invention, is a collection of routines that perform various system-level functions and may be dynamically loaded and unloaded by hardware and device drivers as required. The modular software components described herein may also be incorporated as part of a larger software platform or integrated as part of an application specific component.

The modules of the present invention, in one embodiment, actively seek out data. That is, the modules recognize the existence of certain data connections to, for example, PIM data and other informational stores at mobile devices, desktop PCs, enterprise servers and any computing device coupled to the data aggregation server 100. Client software may be utilized at these different data stores to enable the access to information and to provide for certain authorization/access exchanges as are discussed in, for example, the context of access module 110. The data aggregation server 100, via the appropriate module (e.g., presence module 120) and/or modules (e.g., presence module 120 in conjunction with access module 110) will attempt to contact/respond to a client or some other indicia (e.g., an IP address) reflecting the existence of PIM or other informational data and try to acquire/receive the same.

In another embodiment of the present invention, the data aggregation server 100 (via its various modules) may actually attempt to establish a data connection when a connection is not in existence. For example, if an enterprise server closes a TCP/IP connection to preserve bandwidth, the data aggregation server 100 may attempt to (re)establish that data connection in order to acquire certain PIM or other informational data.

In yet another embodiment of the present invention, the aforementioned clients or other software associated with the data aggregation server 100 may attempt to push PIM and other informational data directly to the data aggregation server 100. For example, a desktop PC may be configured with client software allowing for interaction with the data aggregation server 100. The desktop PC client may recognize the existence of certain PIM or other informational data such as calendar and contact information (e.g., through a calendar or e-mail program at the desktop PC). In an embodiment of the present invention, that client may push the PIM and other informational data to the data aggregation server 100.

Limitations may be imposed on the clients with regard to what information may and may not be pushed. For example, certain information may be designated of low importance/privacy and freely pushed to the data aggregation server 100. Other information may be designed of medium importance and require, for example, the authorization of a user before that information is pushed to the data aggregation server 100. Still further information may be designated high priority/importance and never be pushed to the data aggregation server 100 due to privacy and/or security concerns. Similar limitations may be imposed in a pull scenario wherein the various modules of the data aggregation server 100 seek out that information and pull the information from an associated information source such as a desktop PC but subject to any security/privacy limitations that may be imposed by the desktop PC or other host of the PIM or information data. In some embodiments, the data aggregation server 100 may be configured only to request/receive PIM or other information data of certain security levels in order to avoid the centralization of confidential or private data.

In another embodiment of the present invention, a client operating at, for example, a desktop PC may push certain information to a mobile device. That mobile device may then push the same or a portion of that information to the data aggregation server 100. Similarly, that information may be pulled from the mobile device after having been pushed and/or pulled from the desktop PC.

The present invention does not intend to limit the means by which information is acquired (e.g., push or pull), the existence or non-existence of intermediaries (e.g., data pushed from a desktop PC to a mobile device to a data aggregation server 100) or any security policy that may or may not be in place with regard to the aggregation of PIM and other informational data. A single data aggregation server 100 may further utilize various data acquisition methods for different types of data. For example, the data aggregation server 100 may actively seek to acquire location information via a location module 130 (e.g., a pull operation) but may accept the pushing of data as it pertains to calendar and/or contacts data. In other embodiments, a data aggregation server 100 may send a request to various PIM and information stores for data. The actual delivery of that data, however, may be the result of a client device or other information host pushing the data in response to the data aggregation server 100 request (e.g., a client response to the server invitation).

The modules of the present invention, in addition to aggregating information, may also manage the data. That is, the modules may analyze certain data in order to generate further data as is discussed in the context of, for example, a location module 130 and presence module 120, below. The various modules of the present invention may further execute certain calls and commands as they pertain to storage and retrieval of aggregated data, which may be stored locally, in a Storage Area Network (SAN), at a remote location or in any other medium or apparatus suitable for storage of data and accessing the same. Management and/or storage of data may also be executed by other modules of the data aggregation server 100 that are not presently shown.

Access module 110 comprises or is otherwise coupled to the software, routines, hardware and/or driver devices necessary to control who and what has access to the data aggregation server 100 and the PIM data and other information aggregated and managed by the data aggregation server 100. Access module 110 may be configured to grant or deny access based on, for example, who is making the access request (e.g., a particular user), where the request is coming from (e.g., location as may be determined by a base station or GPS), when the request is occurring (e.g., time of day), what is making the request (e.g., a mobile device) and how the connection is being made (e.g., SSL).

Access module 110 may utilize a user name/password combination to authenticate a user requesting access. A list of users and/or groups with access to the data aggregation server 100 may be created and stored in an LDAP database controlled by LDAP module 170. This database of groups and users may be installed locally or a reside at a remote machine, a SAN or any other device/medium at any location so long as it is suited for the maintenance and access of user access data.

Access module 110 may further utilize SSL authentication whereby a user's identity is confirmed by a security certificate. If the certificate is from a trusted authority, then the certificate is mapped to a user's entry in a certificate mapping file. If the certificate maps correctly, access is granted subject to specific rules set for that particular user (e.g., access control lists and access control entries). If the certificate is not from a trusted authority or fails to map properly, authentication fails and access is denied.

Access module 110 may utilize other access control methodologies such as Host-IP access control wherein access is limited or denied to specific clients as specified by hostnames or IP addresses of allowed or blacklisted clients. Wildcard patterns may be used to control access as it pertains to, for example, entire networks.

Figure 2:
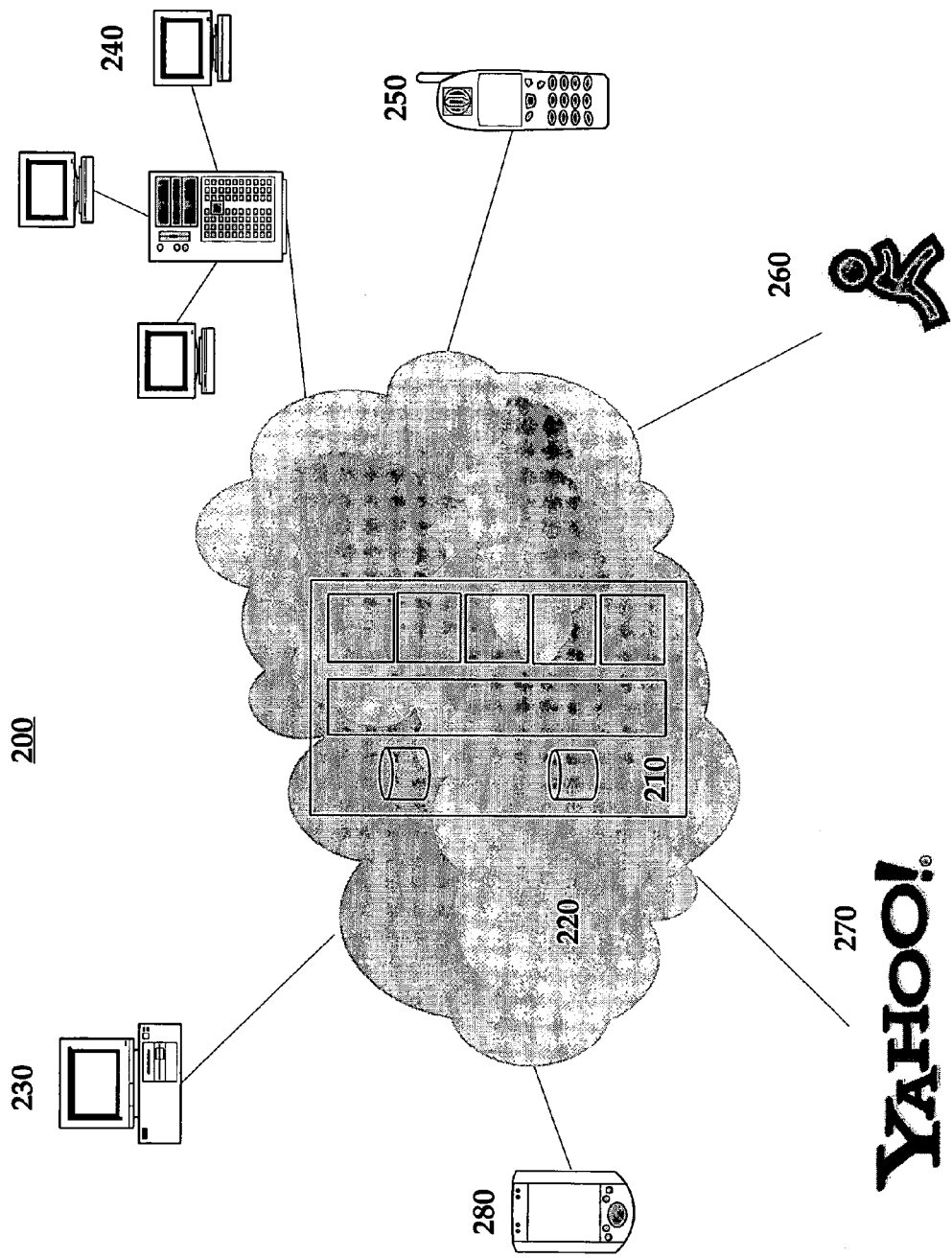
FIG. 2 is an illustration of exemplary networked relationships amongst a variety of sources of PIM data and a data aggregation server.

Access module 110 may further interoperate with presence module 120, location module 130, calendar module 140, groups module 150 and/or contacts module 160 to allow for acquisition of PIM data and other information from multiple sources including desktop PCs, Internet Service Providers, web portals and work directories as is illustrated in FIG. 2 below.

Presence module 120 comprises or is otherwise coupled to the software, routines, hardware and/or driver devices necessary to identify the availability of various subscribers or users of the data aggregation server 100. That is, presence module 120 helps identify who is presently available and through which particular contact methodology they may be contacted.

For example, through application awareness (e.g., via a calendar or through calendar module 140), presence module 120 may determine that a user is presently in a meeting and therefore unavailable (i.e., not present). Alternatively, presence module 120 may, as a result of a manual setting by a user communicatively coupled to the data aggregation server 100 (e.g., a data connection from a desktop PC), determine that a user is available only through a particular contact methodology and display that information as is appropriate (e.g., available—present—via phone and e-mail).

A second user connected to the data aggregation server 100 via, for example, a mobile device may—as a result of information aggregated and made available by presence module 120—ascertain the present unavailability of a first user in their office (i.e., their presence PIM reflects they are out of the office) and, instead, contact that user on their cellular phone where their presence is currently and affirmatively identified.

Various types of presence may be reflected by the presence module 120. Instant messaging, e-mail, home phone, office phone, cellular phone, SMS, pager and any other form of communication device capable of reflecting availability or unavailability are within the scope of the type of presence information aggregated and managed by presence module 120.

Location module 130 comprises or is otherwise coupled to the software, routines, hardware and/or driver devices necessary to identify the physical location of a subscriber or user of the data aggregation server 100. Location module 130 may be utilized in the context of a GPS-enabled mobile device although such functionality is not necessary for the practice of the present invention.

For example, location module 130 may determine that a particular user is presently working at their computer in their office as a result of querying information managed by the presence module 120. Through other modules or applications (e.g., an address book), location module 130 may determine that the user's work address is located at 901 Marshall Street, Redwood City, Calif. In this way, the location module 130 may make intelligent determinations of data even though certain information may not be directly provided to or aggregated by the module. In this way, information can also be generated or aggregated without the requirement of the aforementioned GPS functionality.

Location module 130, through integration with a third-party system or built-in features present or coupled to the data aggregation platform 100 for example, may also aggregate information to be utilized in the context of location information. For example, the location module 130 may aggregate the necessary data to provide text or visual directions to a particular user as it relates to aggregated location information.

Location module 130 may be further configured to make direct queries of users as to their location or to analyze information as provided by cellular base stations as to general locations of users.

Calendar module 160 comprises or is otherwise coupled to the software, routines, hardware and/or driver devices necessary to aggregate calendar and scheduling information of subscribers or users of the data aggregation server 100 and any metadata that may be associated with the same.

Calendar module 140 may seek to aggregate calendar information from a variety of sources of a particular user, for example a mobile device or handheld calendar and a calendar integrated with a desktop PC or enterprise server. The aggregation of calendar data by the calendar module 140 may aid in providing on-the-go synchronization of calendar information. As calendar information constantly changes and provides the greatest possibility for conflict (i.e., two disparate events at two different data stores for the same time period), an embodiment of the present invention continually aggregates calendar information for 'as soon as possible' availability and/or manipulation via calendar module 140.

The aggregation of calendar data may be provided as part of a specific request to view that information. For example, a user may seek to access calendar information at a desktop PC via their mobile device. That calendar information may be aggregated by the calendar module 140 in addition to being conveyed to the client via a pull operation to the data aggregation server 100 and a subsequent push to the mobile device client. In another embodiment, the calendar information may be pulled from the desktop PC or enterprise server all the way to the mobile device client with a copy of the calendar data being cached by the calendar module 140 as it passes through the data aggregation server 100, which may be integrated a communication management system like that described in U.S. patent application Ser. No. 11/217,203.

Similarly, calendar data generated at a mobile device may be aggregated by the calendar module 140 via a pull command at the data aggregation server 100 or via a command issued by a desktop PC. Calendar data may also be pushed directly to the calendar module 140 as a result of certain behavior at the mobile client (e.g., the entry of new calendar information followed by a synchronization operation or a regularly scheduled aggregation operation by the data aggregation server 100). In this way, changes in calendar data that truly occur on-the-go may be aggregated for subsequent synchronization and/or distribution as is appropriate.

Calendar module 140 may further interoperate with presence module 120 to help provide indicia of presence. For example, a presence indicator may normally be manually set by a user (e.g., 'I am Available' or 'I am Not Available'). In the event that a user fails to provide such a manual setting and the user is unavailable, the user's presence setting may be misleading thereby resulting in other users attempting to contact the user but to no avail thereby defeating one of the purposes of a presence indicator. When the calendar module 140 operates in conjunction with the presence module 120, certain calendar information as aggregated by the calendar module 140 may aid in generating a more accurate indicator of presence as provided by presence module 120. For example, the occurrence of a meeting in a calendar would indicate that a user is unavailable. The presence module 120 may then adjust in light of this aggregated calendar data and make an appropriate reflection of the same. When the meeting ends, presence indicators may be readjusted as is appropriate.

Like all of the PIM data aggregated by the present invention, certain information may be allocated a different degree of privacy or importance. For example, different meetings may be of different importance—that is, the meeting may be of critical importance (e.g., a major merger or acquisition) or of lesser importance (e.g., a company presentation on the new credit union membership). Based on metadata embedded in the calendar data (e.g., 'must attend' or 'important'), additional data is acquired by the calendar module 140, which may then be shared through data distribution or utilized by other modules of the present invention.

Metadata embedded in the calendar data and recognized by the calendar module 140 may also be utilized to reflect additional information not necessarily expressly provided by that calendar data (e.g., in a subject description). For example, calendar module 140, through data aggregation, may determine that while a meeting does not begin until 2.00 PM, because of a 'travel required' metadata indicator, any sharing of this calendar information would reflect that an attempt to schedule a meeting with that user during their 'travel time' would be ill advised despite the fact that the calendar might otherwise reflect availability. In some embodiments, metadata reflecting the need to travel and information relating to the address of the meeting (as expressly provided by the calendar entry or as may be obtained through other applications or aggregated information), may allow for the utilization of mapping technologies to provide a more accurate indicator of the exact travel time required and, as a result, more accurate information to be distributed by the data aggregation server 100.

Numerous metadata indicators may be available to be embedded in calendar data and acquired by the data aggregation server 100 via the calendar module 140, for example: none, important, business, personal, vacation, must attend, travel required, needs preparation, birthday, anniversary, phone call, free, tentative, busy, out of office. Additionally, in an embodiment, a user may be able to generate his or her own personalized metadata and provide associate rules with regard to the same.

The calendar module 140 of the present invention, in an embodiment, may aggregate information from both personal and professional calendars. The calendar module 140 of the present invention may further aggregate information pertaining to the availability of conference rooms or conferencing equipment. The calendar module 140 may manage aggregated calendar data and take into account time zone differences in calendar data as may later be distributed to users of the data aggregation server 100. For example, the calendar module 140 may make determinations that 1.00 PM calendar information for a user in California translates into different information when accessed by a user in the United Kingdom. Calendar module 160 may further interoperate with the presence module 120 to make determinations of locations and automatically make the appropriate time zone calculations and/or adjustments when aggregating and/or distributing information.

Groups module 150 comprises or is otherwise coupled to the software, routines, hardware and/or driver devices necessary to form groupings of different users or subscribers of the data aggregation server 100. Groups information acquired and generated by the groups module 150 may be explicit like a ListServ; for example, add user A to group X. Groups may also be implicit and generated as the result of intelligent determinations made by the groups module 150.

For example, the groups module 150 may determine that users A, E and G are all employed by Big Co. and will create (if the group does not already exist) and/or add users A, E and G to the Big Co. group list. The groups module 150 may further determine that users B, C and D are all graduates of State University and create and/or add them to the State University group list. The groups module 150 may further determine that users F, H and I are all members of Professional Organization and create and/or add them to the Professional Organizations list. Furthermore, the groups module 150 may determine that users J, K and L are all Family Members and add them to the Family Members list.

Users may be members of more than one group as generated by the groups module 150. For example, user J could be could be a Family Member and also an alumnus of State University thereby warranting their presence of both the Family Members and State University List. Users may be members of only one group. Users may not belong to any group.

Groups may be identified and/or generated as a result of acquiring data from various sources. For example, a Global Address List (GAL) may represent a comprehensive list of e-mail addresses, fax and telephone numbers, and mail stops for the employees and contractors for a particular company. In addition to being a raw source of contact data, the GAL could in and of itself be the basis for generation of a group (e.g., Company Group).

Contact data aggregated by a contacts module 160 may be categorized and grouped by the groups module 150, may be manually entered (e.g., input by a user) or obtained through a synchronization operation. In any of these instances, the groups module 150 is configured to aggregate the new information and group it properly.

As noted, contact data as aggregated by the contacts module 160 may be implemented by the groups module 150. For example, if the groups module 150 determines that it has incomplete data for a member of a group or a contract entry in general, the groups module 150 may actively seek that member/user's absent information through, for example, accessing a GAL or even an LDAP database comprising user information or another operation in conjunction with the contacts module 160. Providing absent information or updating out-of-date information may also be accomplished through linking to other user PIM data as is further described in the present disclosure.

Contacts module 160 comprises or is otherwise coupled to the software, routines, hardware and/or driver devices necessary to aggregate contact information from different sources of contact data. While the most common sources of contact PIM data are address books or contacts lists, the contacts module 160 may aggregate data through intelligent operations wherein elements of contact information are identified and more complete information is aggregated for the purpose of generating a more accurate and complete contact profile.

For example, the contacts module 160 may determine that User A contacted the present subscriber via a telephone call but the name and e-mail address of User A is not available—only their phone number. The contacts module 160 would then seek that absent information from various sources such as local directories, username/password stores, the Internet, contact lists of other users, corporate personnel directories or any other sources of information that might link the phone number to more identifying information for use in a contacts profile. Similar queries could be made based on received and sent e-mails or any other indicia of contact or interaction by the user (e.g., SMS and instant message).

The contacts module 160 may further query other information networks and/or data aggregation servers (e.g., a platform embedded in the network of a separate service provider but with whom the present service provider has an informational sharing agreement) to determine the identity of User A. The contacts module 160 could also directly query the user for the missing information through, for example, an SMS message requesting the information be entered at the mobile device or a desktop PC.

Contact information may also be acquired from various other applications. For example, and as noted above, the receipt of an otherwise unknown phone number can begin the acquisition of contact information such as name, physical address and other identifying contact information (e.g., company, title, etc.). Information may also be obtained from e-mail headers whereby a domain name (e.g., @company.com) may be traced to a particular company or from the body of an e-mail through an e-mail signature or footer. Similarly, instant messages—as a form of contact—may be utilized to generate a profile or parts thereof. Outgoing phone calls, e-mails and SMS messages can be used in a similar fashion.

Calendar data may also be used to acquire contact information as it pertains to, for example, a corporate/work address (e.g., 10 AM meeting at SEVEN Networks, Inc. at 901 Marshall Street, Redwood City, Calif. 94063) of a particular person. Based on that calendar data, the contacts module 160 may determine that the 10 AM with Person X was at Person X's place of employment: SEVEN Networks, Inc. and generate appropriate contact information and profile data concerning employer and business address. In this way, the employment and address information of Person X can be populated without an express input of that information into a particular user/contact profile having ever been made. Similarly, anniversaries, birthdays and other repeating and/or important dates may be associated with particular contacts.

Contact information—and other PIM data for that matter—may be obtained from other profiles of users of the data aggregation server 100 subject to privacy and security profiles. For example, User A may have a complete profile indicating name, phone number, address, employment and e-mail information. User B's profile may only designate employment information, specifically, the name of their employer. The contacts module 160 of the data aggregation server 100 may, by matching the employment information of Users A and B through a linking operation, populate other fields in User B's profile. For example, User B's profile with regard to a general phone and fax number as well as corporate address can be populated as User B works for the same company as User A, that same information being fully present in the contact information/data profile for User A.

It is envisioned that in some embodiments of the present invention, various Internet spiders or web scraping technologies may be utilized by the contacts module 160 to further acquire presently unavailable information. In such an embodiment, a web scraping module (not shown) could further identify a particular contact/user profile and search various websites for information and news pertaining to that person. If it is determined, during spidering, that this particular person has changed jobs, been promoted or been subject to some other event of news-worthy importance, the contacts module 160 may update certain contacts information/profile data.

LDAP module 170 is a TCP/IP software protocol enabling users to locate organizations, individuals and other resources in an open or proprietary network (e.g., look-up queries). LDAP module 170 makes it possible for almost any application running on virtually any platform to obtain directory information, service data and public keys. LDAP module 170 may be based on the X.500 open standard whereby applications need not worry about the type or location of servers hosting the queried directories. LDAP module 170 may further identify user privileges on a network.

Voice gateway 180 terminates PSTN traffic from callers. Voice gateway 180 may comprise an automated speech recognition engine (not shown) to perform speech recognition; a dual tone multi-frequency (DTMF) module (not shown) for recognition of key tones; and audio playback and record components (not shown). Voice gateway 180 may further comprise a Voice Extensible Markup Language (VXML) interpreter (sometimes referred to as a voice interpreter) (not shown) for interpreting VXML markup, playing synthesized speech and/or listening for user responses in the instance of automated speech recognition.

Other modules may be introduced to the data aggregation server 100 so long as they do not interfere with the aggregation and management of PIM data from various sources such as an enterprise server or PC or those other sources as exemplified in FIG. 2 below.

FIG. 2 is an illustration of exemplary networked relationships 200 amongst a variety of sources of PIM data (230-280) and a data aggregation server 210 as may be found in the present invention.

Data aggregation server 210 is an aggregation server like that described in FIG. 1 and as may be integrated with or otherwise communicatively coupled to a service provider's communications network 220 (e.g., Cingular Wireless or SBC Communications). The data aggregation server 210 is coupled to various sources of PIM data such as PCs 230, enterprise servers 240, mobile phones 250, instant messaging networks 260, ISPs 270 or other information sources such as PDAs or Smartphones 280.

While FIG. 2 reflects direct connections between the data aggregation server 210 (via the service provider's communications network 220) and these various sources of PIM data 230-280, this is not suggest the requirement or existence of a point-to-point or direct connection. For example, mobile phone 250 will be connected to the data aggregation server 210 through not only the service provider's communications network 220 but also a variety of base stations and other intermediate communications networks (not shown). Similarly, a computer network as provided by PC 230 or enterprise server 240 will comprise a series of routers between the source of information (e.g., the PC 230) and the data aggregation server 210. Similarly, an Internet portal 270 like Yahoo!® or an IM network 260 like that offered by America Online™ will comprise a series of gateways, servers and/or other intermediate software and/or hardware before becoming communicatively coupled with the local and wide area networks that will further couple the Internet portal 270 or IM network 260 to the data aggregation server 210 via the service provider's communications network 220.

PC 230 may be any type of home computing device; for example, a desktop computer or a laptop computer. PC 230 may be coupled to data aggregation server 210 via an ISP such as SBC Communications, which provides DSL service or a dial-up service provider such as America Online™. The present invention envisions the use of a variety of communication channels for communicating between a PIM data source and the data aggregation server 210, for example, the aforementioned DSL and dial-up services as well as satellite and wireless communications. Other communication mediums may be utilized as well, such as Bluetooth or InfraRed. No limitation as to the use of a particular communication medium is meant to be imposed by the present invention nor is there meant to be the requirement of a homogeneous communication link between the PIM data source and the data aggregation server 210 (e.g., there need not be—nor will there usually be—a single DSL link all the way between PC 230 and the actual data aggregation server 210).

PC 230 may be equipped with connection software allowing for the establishment of a data connection between the PC 230 and a communications management system like that described in U.S. patent application Ser. No. 11/217,203 whereby data may be synchronized with an associated mobile device (e.g., mobile device 250). Such a data connection may allow for the redirection of, for example, e-mail and mobile access to PIM data residing in a memory store at the PC 230.

Enterprise server 240 shares similarities to PC 230 with the exception that the enterprise server 240's architecture is more complex with regard to the introduction of not only the server but often a series of additional application servers, data stores and work stations that may resemble (or be the same as) a computing device like PC 230. Enterprise server 240 may be exemplified as a Microsoft® Exchange Server or a Lotus® Domino Server from IBM to manage the receipt, storage, delivery and access to e-mail as well as other application and PIM data. An enterprise server generally serves a larger group of users via a server-client relationship whereas a single PC (e.g., a home computer) generally serves an individual user. Enterprise server 240 may also comprise a software connector allowing for redirection and access to e-mail and other corporate data to an associated mobile device (e.g., mobile device 250) via a communications management system like that described in U.S. patent application Ser. No. 11/217,203.

Mobile device 250 may be a cellular device allowing for Internet or other data access whereby a data connection with a communications management system and/or data aggregation server 210 may be established. In an exemplary embodiment of the present invention, the network architecture and service provider's communications network 220 of a mobile service provider may be directly integrated with the data aggregation server 210 of the present invention. Data aggregation server 210 may also be integrated with other network operators (e.g., shared by a plurality of service providers) or communicatively coupled to another service provider communications network 220 comprising its own data aggregation server 210 (e.g., a data aggregation server in the Cingular Wireless network may be coupled to a data aggregation server in a Sprint PCS network).

IM network 260 provides the necessary functionality (e.g., hardware and software) to allow for real-time, text-based conferencing over the Internet or another communications network between two or more people. Many IM providers now offer the integration of still-images, avatars, audio clips and, in some instances, video clips as a part of the IM experience. IM network 260 may also provide a series of contact lists or 'buddy lists' that function as a source of contact information (i.e., PIM data) utilized by the data aggregation server 210 and, more specifically, a groups module as described in FIG. 1. An example of an IM network service provider is America Online™. America Online™ provides instant messaging not only to America Online™ dial-up service subscribers but also as an independent application that may be downloaded and installed on a desktop computer (e.g., PC 230) or, as is increasingly common, a mobile device (e.g., mobile device 250).

Internet portal 270 may be a single point for the access of information over the Internet, specifically, the World Wide Web. Yahoo!® is an example of an Internet portal 270 that provides a comprehensive single point of access for, conceivably, any information the average individual would need from the World Wide Web; for example, a search engine, maps, news, weather, e-mail, calendaring, various other forms of PIM data and so forth. Consistent with being a single offering, Internet portal 270 may offer a variety of other services including instant messaging (e.g., Yahoo!® Messenger) or even Internet access (e.g., Yahoo!®/SBC® DSL). By logging on with a user ID and password, Internet portal 270 may also allow for the generation and customization of personal pages wherein the user can request the delivery of and direct the layout of particular information, including PIM data.

For example, a particular user may want headline news pertaining only to the San Francisco area but also desires weather reports in Sunnyvale, Calif., and San Francisco, Calif., as the user might live in one location and commute to the other for work. Similarly, the user may be a transplant from the East Coast and still actively follow sports teams on the East Coast. As such, the user may further organize their personal page to display sports scores concerning the Boston Bruins hockey team and the Boston Red Sox baseball team instead of information concerning the San Jose Sharks and San Francisco Giants, which might otherwise be logically be displayed in the context of news and weather for the San Francisco region.

As noted, certain of this information may be utilized in the context of identifying and generating PIM data aggregated by the data aggregation platform 210. For example, a personal calendar displayed on the user's personal page; an address book linked to the user's personal page and so on.

PDA 280 may be a portable device offering, for example, notepad and calendar/scheduling functionality. PDA 280 may have certain network functionality to allow for data exchanges with other PDAs or compatible devices as well as a larger communications network enabling synchronization with a home or work computer where a companion calendaring program may be installed. Many PDA functionalities have been incorporated into the likes of mobile device 250 or smart phones.

The various aggregation modules of the data aggregation server 210 may acquire data from these various information sources of PIM data through integration with a particular data source. For example, the data aggregation server 210 may be integrated or configured to access and operate with an instant messaging network 260 like that offered by America Online™. That is, America Online™ and a service provider implementing the data aggregation server 210 (e.g., as a part of a data aggregation and publication service) may reach an agreement allowing access of the data aggregation server 210 to the instant messaging network 260 thereby providing near unfettered access and certain sharing of information between the two systems as a result of systematic design. Once the data aggregation server 210 is implemented/integrated with, for example, the instant messaging network 260, data aggregation may commence unabated as the data aggregation server 210 operates as if it is a normal operating presence in the network.

The various aggregation modules of the data aggregation server 210 may also act as a proxy with the proper user credentials to access a particular information network. For example, the data aggregation server 210 may be provided by certain user name and password information to access an Internet portal 270 like Yahoo!®. That is, a user of the services offered by the data aggregation server 210 would provide their user name and password to the data aggregation server 210, most likely during a registration or subsequent account update procedure with a data aggregation and publication service. Thus, any time the data aggregation server 210 seeks to access the Yahoo!® Internet portal 270 to acquire information from, for example, an online/webpage calendar, the user's username and password will be provided to the Yahoo!® Internet portal 270 just as if the user were sitting in front of a keyboard and display and manually entering the information. Once access is granted to the Internet portal 270, aggregation of information may commence.

In some instances, various authentication tokens or cookies might be granted by various PIM data sources either as the result of a request to access certain PIM data or as a result of a correct username/password combination. Various security methodologies as discussed in the context of, for example, access module 310 (above) may also be applicable with regard to establishing credentialed relationships between the data aggregation platform 210 and various sources of PIM data.

It some instances, it is perceived that a combination of data aggregation methodologies may be necessary. For example, username and password for certain PIM data sources and system integration for others.

The data aggregation server 210 also provides for the aggregation of data from amongst different users of the service. For example, one user may provide his various user names and passwords in order to access certain PIM information stored in that particular users different PIM sources such as an instant messaging network 260 or an Internet portal 270. But aggregating one user's information does not help to create a network of information. In order to build a larger informational community, access to other user's PIM data is required. But while an instant messaging network 260 may allow the data aggregation server 210 access based on system integration or username/password combinations (either directly or by proxy), any secure system will be unlikely to allow a first user to access a second user's information without some sort of permission.

While that permission may be explicitly granted by another user (e.g., User B grants User A to access their information at instant messaging network 260), such an arrangement is unlikely because of security and privacy concerns of both the instant messaging network 260 and the user. For example, a user may have no qualms about granting another user information about certain information on an instant messaging contacts list (e.g., professional colleagues with whom both users interact in the office) but will likely be hesitant to share information concerning family members or other personal relationships. Control of who receives what information can cause the implementation of an entire new layer of security or management software that the instant messaging network 260 may be hesitant to implement because of costs or other concerns.

Such a concern is the fact that most instant messaging network (like America Online™) are not in the business of providing an open network. That is, these services provide an instant messaging service to individual users and subscribers and it is up to those individual users to determine who knows who is on their contacts list; that is, America Online™ will not provide that information to other users. While data representative of that information may be stored by the instant messaging service that service will likely make every effort to keep that list secure and private from all other users. The service provider offering means to share or network this contact or other PIM data is unlikely due to, at the least, privacy and business/commercial relations in the marketplace.

The present data aggregation server 210 overcomes this hesitancy of different PIM data sources to openly share information. For example, User A and User B are both members/ users of a data aggregation and publication service offered through the data aggregation server 210. User A may provide certain security information to the data aggregation server 210 in order to access the aforementioned instant messaging network 260. In this way, User A can aggregate PIM data from his instant messaging network account (e.g., members of his contacts lists, those members instant messaging IDs and so forth). User B will have provided certain security information to the data aggregation server 210 to allow the collection of PIM data in his account.

While an instant messaging network 260 may not be obliged to provide a system for sharing PIM data amongst its users, the present data aggregation server 210 does provide such interactions. User A will set up certain permissions with the data aggregation server 210 to allow User B to access User A's PIM data. User B will provide similar permissions such that User A may access User B PIM data. The permissions system of the data aggregation server 210 also allows for setting of limitation on who may access what information. Therefore, User A may allow for User B to access his contacts information—but not his calendar information. Similarly, User B may allow User A access to his calendar information but not his presence information. Permissions may be assigned to individuals via, for example, contacts module 160 or to groups of individuals as may be determined by the groups module 150. In one embodiment of the present invention, a permissions module (not shown) may govern these relationships. In another embodiment, such permissions may be governed by the access module 110.

Sub-permission levels may also be set in the data aggregation server 210. For example, User A may be able to access User B's calendar information—but only particular aspects of his calendar information as may be governed by, for example, metadata. Similar limitations may be set with regard to other PIM data (e.g., access only to personal contacts and not professional contacts).

The shared PIM data (via permissions) of the data aggregation server 210 enables the creation of a growing network of contacts and relationships through, for example, linking. For example, User A may know User B; User B, in turn, may know User C. As a result of this single-degree of separation and the establishment of a link, User A may now have access to User C's contact information. Additional permissions may be set with regard to how many degrees of separation information is shared (e.g., only with persons on my contact list or with persons on the contact lists of persons on my contact list).

Additional permissions may be imposed with regard to aggregating data to complete incomplete data records. For example, User A may have an entry for John Doe but no phone number for John Doe. User B, however, may know John Doe as well and have a complete data entry (e.g., name, phone, address, birthday, etc.). Permission settings may be established wherein the data aggregation server 210, on behalf of User A, accesses the data of User B via a linking operation to gather the remainder of this contact information (e.g., phone number). While User A may now have a complete data record for John Doe, he may be entirely unaware of the source of that information. That is, User A may now know that information was aggregated from PIM data of User B or that John Doe is on User B's contacts list.

Access to various PIM data of other users by the data aggregation server 210 occurs as a result of the operation and interaction of various modules within the data aggregation server 210.

In this way, certain protocol limitations may also be overcome in that it is not necessary for User A, who might be a Yahoo!® user, to directly communicate with an America Online system for the purposes of acquiring information about User B. User B, instead, directly interacts with the America Online system and then User B shares that information with User A in a common protocol.

Notwithstanding the protocol particularities of certain networks or PIM data sources, the present invention may, in an embodiment, utilize whatever protocol is necessary to communicate with that network/PIM data source in a way that the particular network/PIM data source will understand communications from the various modules of the data aggregation server 210. For example, the present invention would communicate with the Yahoo!® Internet Portal with regard to e-mail using IMAP. The present invention would communicate with a Microsoft® Exchange® Server using MAPI and so on. Distribution of data, too, may require the use of multiple protocols. For example, TCP/IP for a standard data connection to, for example, a desktop computer but use of WAP for communicating with a wireless device. In that regard, the present invention may be multi-protocol based.

Figure 3:
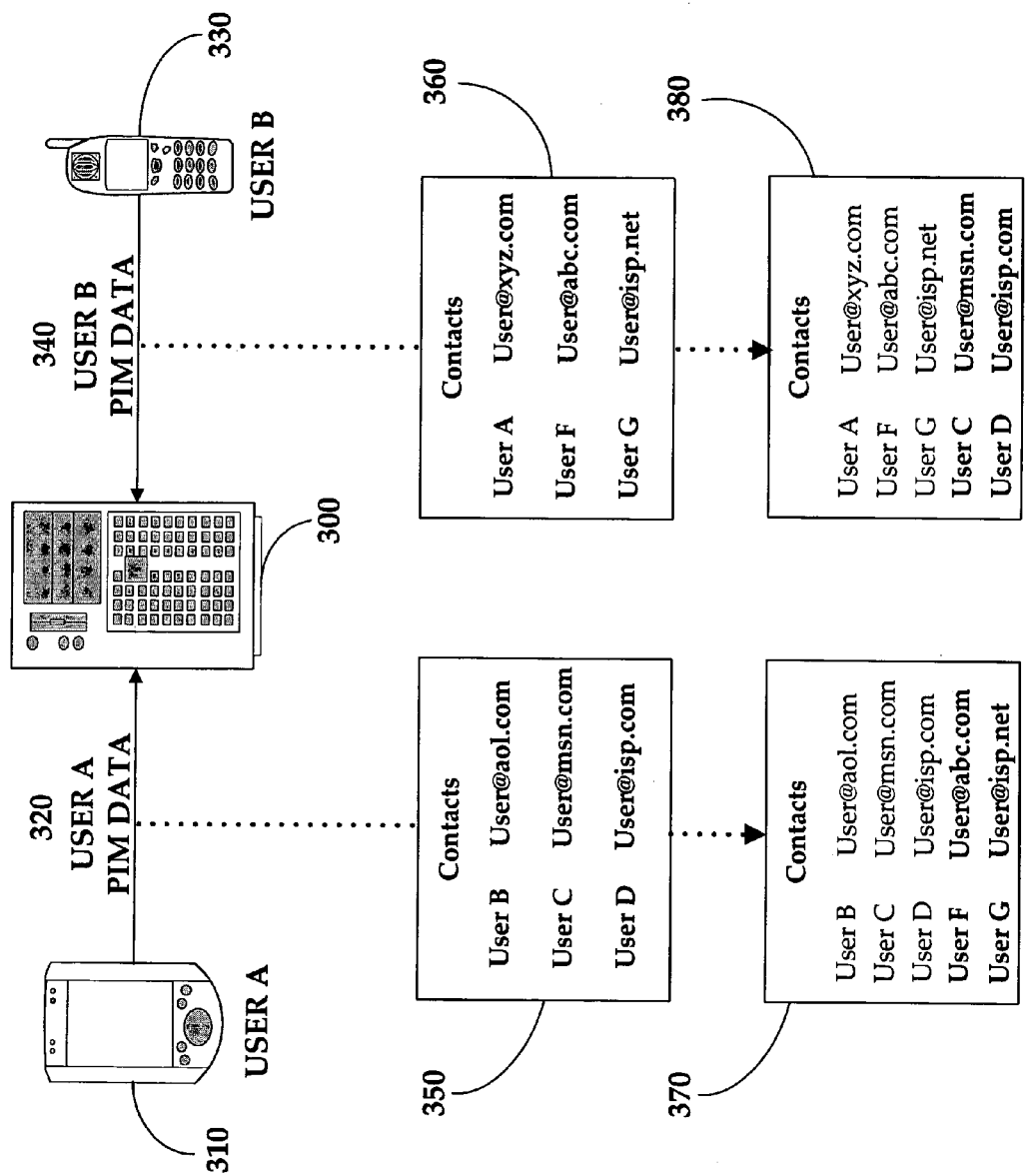
FIG. 3 illustrates an exemplary data aggregation server's aggregation of PIM data and subsequent population of user profiles.

FIG. 3 illustrates the aggregation of PIM data and subsequent population of user profiles by an exemplary data aggregation server 300. Data aggregation server 300 is like that described in FIGS. 1 and 2 (100 and 210, respectively). User A (310) enrolls with a data aggregation and publication service as may be provided by a network service provider such as Cingular Wireless (cellular) or SBC Communications (DSL). The data aggregation and publication service need not be provided by a network service provider but may be a service or feature offered by an independent third-party for integration with the service provider's network. User A 310, in the present example, is the user of a Smartphone such as the Treo 600. User A 310 possesses certain (User A) PIM Data 320 such as names, phone numbers and e-mail addresses. User B (330) also enrolls with the data aggregation and publication service. User B 330, in the present example, is the user of a cellular device with contact management and e-mail functionality such as a Sprint MM-5600. User B 330 also possesses certain (User B) PIM Data 340.

When a user, like Users A and B (via devices 310 and 330), enroll with the data aggregation and publication service, a profile for each user is created. This profile includes certain PIM data such as e-mail addresses, phone numbers, names, addresses and so on. This profile may be stored at the data aggregation server 300 or in any storage device or system otherwise accessible by the data aggregation server 300.

During the creation of User A's Profile 350 with the data aggregation and publication service via the data aggregation server 300, relevant User A PIM Data 320 is copied into the User A Profile 350. Relevant PIM data to be copied to a profile can be a global copy routine wherein all contact information in a device is copied or only certain portions of PIM data (e.g., names and e-mail addresses) or only certain categories of PIM data (e.g., business contacts or personal contacts) or, further, PIM data meeting certain security levels. Various other identifiers of what constitutes PIM data may be sent by the user or may be determined independently by the data aggregation server 300 as this information is acquired. Acquisition of this information may occur as the result of a push operation wherein the PIM data is pushed from the device to the data aggregation server 300 or the data aggregation server 300 pulls the information from a device. The transfer of this information may occur over any variety of communications networks, for example, wireless networks or landline networks (e.g., phone lines or DSL).

User A Profile 350, as illustrated in FIG. 3, was created, in part, as the result of copying User A PIM Data 320 from User A's Smartphone 310. In User A Profile 350, the names and e-mail addresses of three users are displayed: User B with an e-mail address of <User@aol.com>; User C with an e-mail address of <User@msn.com>; and User D with an e-mail address of <User@isp.com>.

FIG. 3 also illustrates User B Profile 360 wherein certain PIM data is displayed. User B Profile 360 was created, in part, as the result of copying User B PIM Data 340 from User B's cellular device 330. In User B Profile 360, the names and e-mail addresses of three users are displayed: User A with an e-mail address of <User@xyz.com>; User F with an e-mail address of <User@abc.com>; and User G with an e-mail address of <User@isp.net>.

A server configured with the necessary data aggregation and publication software allows the server to operate as data aggregation server 300. The data aggregation server 300, amongst its plurality of users—including User A and User B—recognizes and correlates or matches user profiles like User A Profile 350 or User B Profile 360. A 'match' or correlation of user profiles by the data aggregation server 300 may include recognizing a correlation amongst different PIM data entries. For example, the data aggregation server 300 may recognize matches of names, e-mail addresses, phone numbers, business contact information or any other category of data amongst two or more users. For example, the data aggregation server 300 recognizes that User A's Profile 350 identifies the name and e-mail address of User B who also happens to be a user of the data aggregation and publication service. In that regard, the data aggregation server 300 also recognizes that User B's Profile 360 identifies the name and e-mail address of User A who is also a user of the data aggregation and publication service.

Recognition and correlation/matching of user profiles need not be bi-directional. That is, User A does not need to identify User B in User A's Profile 350 and User B does not need to identify User A in User B's Profile 360 in order to identify and generate a match. It may be sufficient for the data aggregation server 300, with regard to User A and only User A, to identify User B who is listed in User A's Profile 350. The data aggregation server 300, in this example, need only recognize that User B is a user of the data aggregation and publication service and that User B is identified in User A's Profile 350 in order to generate a match. That is, the generation of a match may be unidirectional.

Once identifying a match, the data aggregation server 300 may undertake a number of different operations. A first option is for the data aggregation server 300 to automatically create a link between User A and User B. By creating this link, User A's Profile 350 is populated with User B PIM Data 340 from User B's Profile 360 and vice versa: User B's Profile 360 is populated with User A PIM Data 320 from User A's Profile

350. The result is a more detailed and diverse user profile for User A as reflected in Updated User A Profile 370. A similar result occurs in the case of User B wherein User B's Profile 360 is populated with User A's PIM data 320 to result in Updated User B Profile 380.

As can be seen in Updated User A Profile 370, the contact data has expanded from the original listings of Users B, C and D and now includes Users F and G and their corresponding e-mail address information. Users F and G were initially identified in User B PIM Data 340 and User B Profile 360 but are now listed as a part of the Updated User A Profile 370. Similarly, User B's Profile 360 has now expanded from the original listing of Users A, F and G to now include User A PIM Data 320, which includes Users C and D and their related contact information. This newly introduced PIM data is reflected in Updated User B Profile 380.

The data aggregation server 300 may, instead of automatically creating the link, request permission to create a link. The request for permission may be to either of the users in the aforementioned User A and User B scenario. For example, the data aggregation server 300 may query User A whether it is acceptable to create the link with User B and vice versa.

The creation of the link may also be limited with regard to the direction of linked data. For example, User A may be queried as to whether a link with User B is permitted. If a link is acceptable, the flow of PIM data may be limited only to outgoing data, that is, User A PIM Data 320 may be provided to User B but User B PIM Data 340 may not be provided to User A. In this scenario, User B would ultimately have an Updated User B Profile 380 that includes PIM data from User A but User A would retain only their original profile (350) in that no new PIM data is introduced. This may be desirable if a user has a device that is shared by others or does not use secure communication channels and the user wishes to limit the amount of potentially sensitive PIM data that may reside on their device. This may also be desirable if the user wishes to keep a 'streamlined' contacts application with only critical contact information and not the plethora of contact entries that might exist in User B PIM Data 340. In some embodiments, it may be desirable to limit incoming PIM data to only certain forms of PIM data such as business contacts, personal contacts and so forth.

Various other security limitations may be implemented to allow the sharing of PIM data but to retain certain confidential entries. For example, a user might designate certain entries as confidential and prevent them from being shared with other users. A user might also categorize certain entries as confidential through their placement in certain organizational folders, the folders being categorized as confidential. A user may also designate certain elements of PIM data as confidential. For example, a user may allow the free exchange of names and company affiliations in the case of business entries but prevent the sharing and dissemination of phone numbers and e-mail addresses.

In the event a user who receives this updated—but otherwise incomplete—PIM data wishes to have access to the entirety of the PIM data (e.g., the e-mail address that accompanies a particular name), the receiving user may make a request to the originating user through a specially generated e-mail by an application unique to the data aggregation and publication service and via the data aggregation server 300 or an SMS communication in a similar fashion to provide that information. The originating user may accept or deny the request with the information being provided or withheld as is appropriate. Traditional e-mail and SMS communications may also be used wherein the originating user may then attach the requested PIM data file in a reply. In other embodiments, it is possible that the entire PIM data file may be provided to a user but that particular portions of the file (e.g., private information such as phone numbers) are encrypted. Instead of a receiving user requesting the encrypted information, they may instead request an encryption key wherein the encrypted information is unlocked and made available. This unlocking of information may be with regard to particular entries, groups of files or an entire library of PIM data received from an originating user. These encryption keys may be provided directly by the originating user or may be stored at the data aggregation server 300 and the location or means of access to these keys made available to the requesting user at the election of the originating user.

Other security implementations include degrees of trust amongst different users. For example, an originating user may designate certain users as highly trusted and therefore having access to all available PIM data or certain classes of PIM data. Other users may be designated as moderately trusted users. These users would have access to certain portions of PIM data or certain groups of files but not the same degree of access as offered to highly trusted users. Other users may be designated as low trusted users with even lesser degrees of PIM data while still other users may be designated as no trust users. These users would be required to make a request for all degrees of PIM data on a case-by-case basis. Degrees of trust can be applied against PIM data as a whole or certain classes of PIM data (e.g., business PIM data or personal PIM data). Different classes of trust may also be established by an originating user wherein certain groups of persons (e.g., family members, office colleagues or 'college buddies') are granted access to certain degrees, classes or portions of PIM data.

Security may be managed locally at a client device or centrally via the data aggregation server 300 or a resident or coupled security module or application. PIM data, in one embodiment, is pushed through the data aggregation server 300 as PIM data is updated. The updated PIM data is then distributed to various recipients in accordance with various permissions. In other embodiments, the PIM data may be pulled from various clients in response to a request from another user for updated PIM data. For example, a user may request PIM data in response to knowing that updated PIM data exists (e.g., User B has moved to a new town and has a new phone number; User A will then request that new PIM data with the knowledge that User B will likely have updated their personal contact information in a device hosting PIM data). In still other embodiments, PIM data may be stored at the data aggregation sever 300 or in a storage device or system coupled to and otherwise accessible by the data aggregation server 300. Storage of certain portions of PIM data for the purposes of identifying matches or for undertaking certain intelligent determinations, as has been described in co-pending U.S. patent application Ser. No. 11/217,203, which has been incorporated herein by reference, may also occur.

PIM data may also be stored in personal accounts associated with the data aggregation server 300. For example, a first user may push their updated PIM data to the data aggregation server 300 for distribution to authorized recipients. A second user, however, may not want data pushed to their device due to any variety of factors, for example, limitations on bandwidth usage that may be imposed by a service provider or traveling outside a home service area wherein roaming charges are in effect. In this instance, the receiving user may instruct the data aggregation server 300 to 'hold' any new data in their account associated with the data aggregation server 300. Once the user re-enters a 'home' service area or limitations on bandwidth consumption are no longer a concern, the user may then pull that information from the account associated with the data aggregation server 300. Delivery of PIM data may also be subject to a regular polling of the data aggregation server 300 (e.g., poll for new available PIM data every 6 hours or every 2-days) as may be set by the user or automatically imposed by a service provider. Checking for new PIM data may also occur during the course of another transaction (e.g., while pushing newly generated PIM data to the data aggregation server 300, newly available PIM data is pulled or during the course of the push or pull of e-mail or other data, like calendar data).

Figure 4:
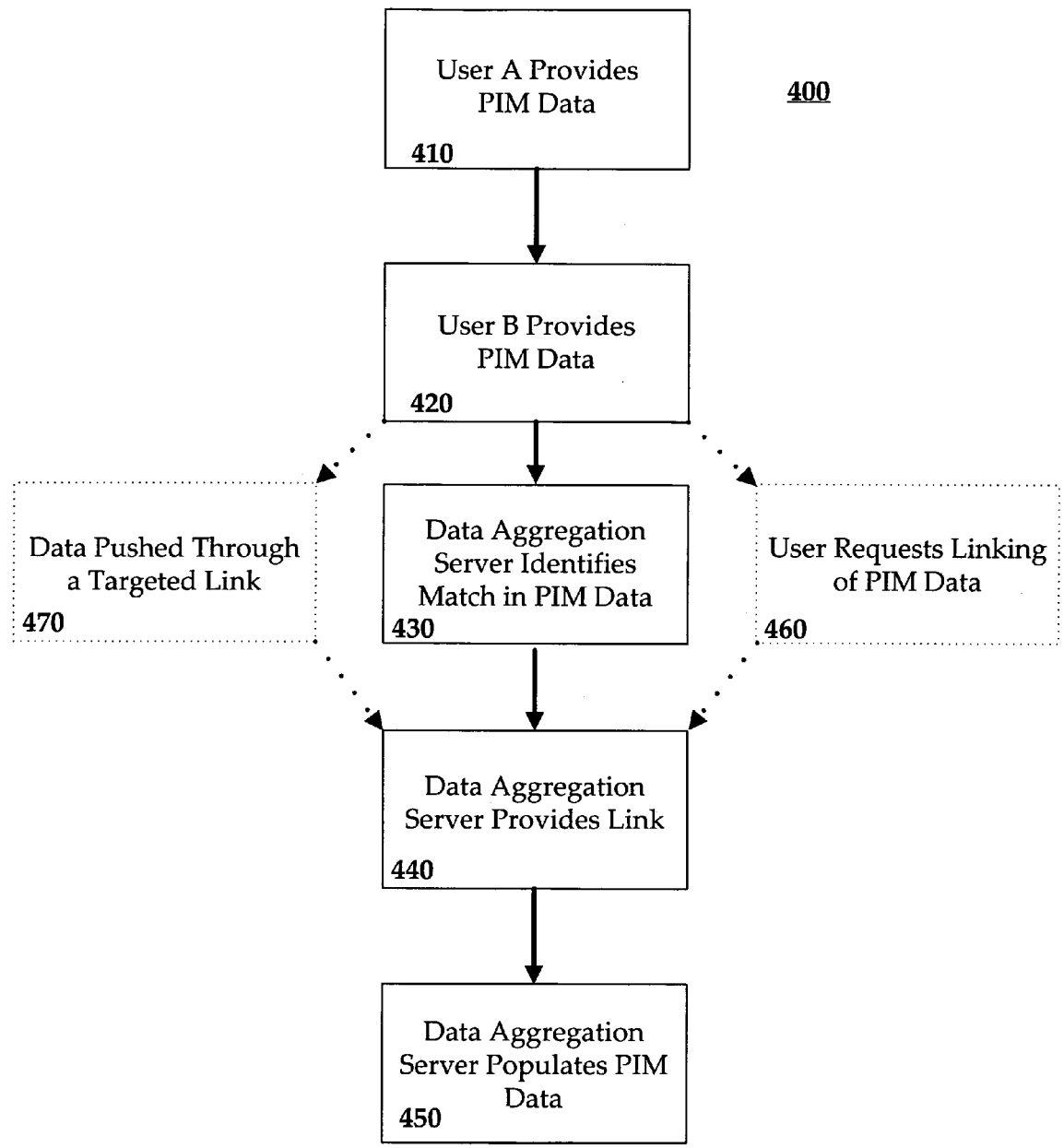
FIG. 4 illustrates an exemplary methodology for linking PIM data amongst users in a data aggregation and publication network.

FIG. 4 illustrates an exemplary methodology 400 for linking PIM data amongst users in a data aggregating and publication network. In step 410, a first user (User A) provides certain PIM data to the data aggregation server 300. In step 420, a second user (User B) provides PIM data to the data aggregation server 300. While FIG. 4 only illustrates a first and second user, the methodology is generally the same for any number of users.

In step 430, the data aggregation server 300 identifies a match or correlation in PIM data. For example, User A is identified as an entry in User B's PIM data and/or vice versa. Other possible correlations may be identified such as common employment, family members and so forth. Specific correlations may be identified by a user for subsequent identification by the data aggregation server 300 (e.g., identify all users in a certain zip code). Once a correlation/match has been identified in step 430, the data aggregation server 300 provides a link in step 440. As has been noted, the link may occur automatically or may be subject to the data aggregation server 300 querying whether to make/accept the link in addition a number of other security limitations. Subject to these limitations and/or acceptance of the link being established, the link is established and the PIM data is populated to various profiles as is appropriate in step 450.

In an alternative embodiment (step 460), instead of the data aggregation server 300 identifying a correlation in the PIM data, a user of the data aggregation and publication service offered by the data aggregation server 300 may specifically request the acquisition and distribution of PIM data. For example, one user may be aware that a second user has recently updated their PIM data or PIM data otherwise in their possession. That user may specifically request the updated PIM data be populated into their PIM data profiles. The link is then established in step 440 and the data populated in step 450.

In yet another embodiment (step 470), PIM data is pushed to targeted recipients. For example, a user of a data aggregation and publication service may wish for family members to have immediate access to updated PIM data following a move to a new job in a new city. In this embodiment, the provider of the updated PIM data may seek to directly link with desired recipients of the data so that their PIM data profiles are updated in a timely manner. The direct link may be subject to the aforementioned acceptance and security protocols as discussed in the context of other embodiments.

Figure 5:
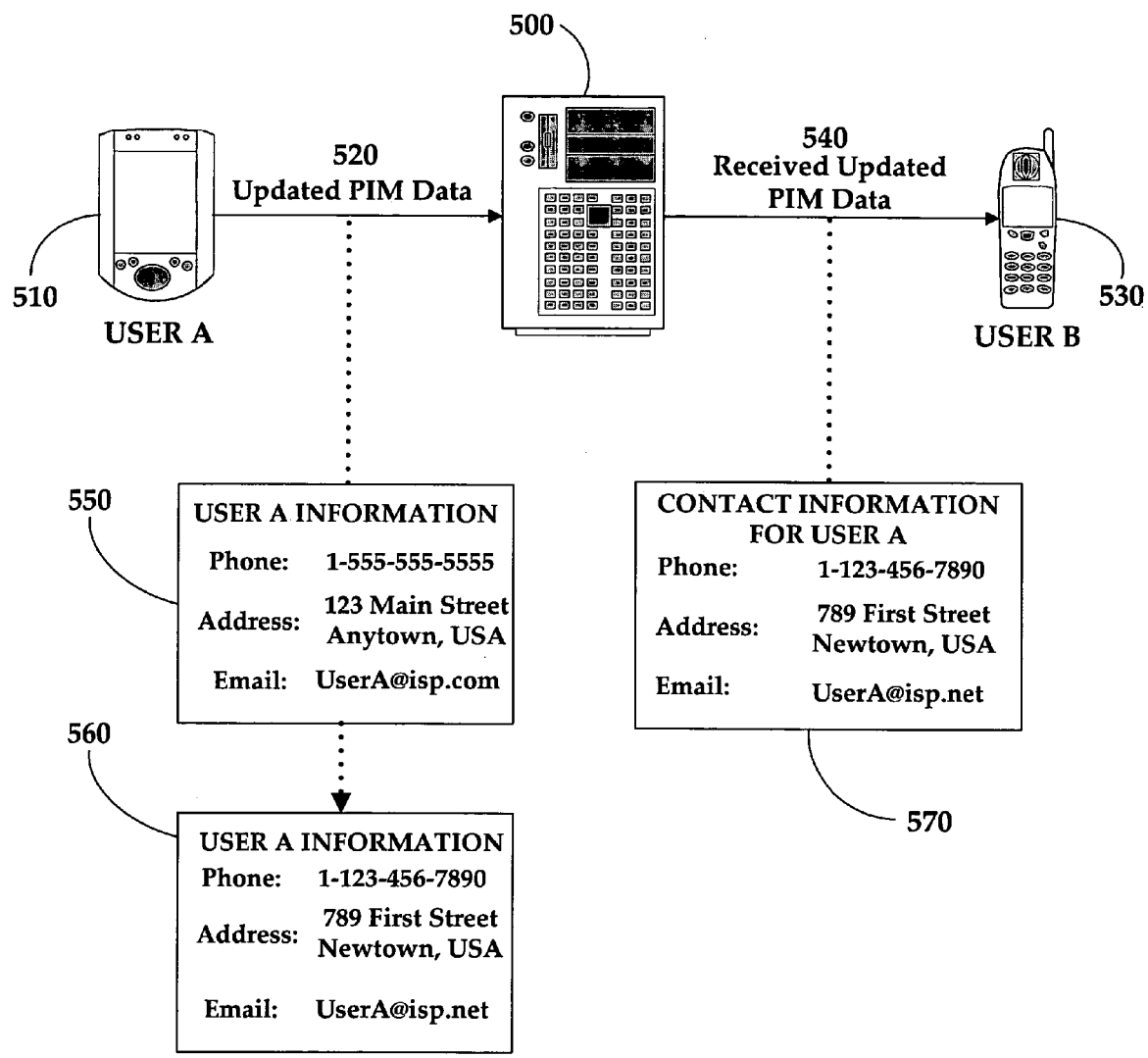
FIG. 5 illustrates a linking functionality providing updated PIM data amongst users in a data aggregation and publication network.

FIG. 5 illustrates the linking functionality of an embodiment of the present invention wherein updated PIM data is provided amongst users of a data aggregation and publication service. User A's device 510 is coupled to a data aggregation server 500 that offers data aggregation and publication functionality. User A's device 510, in the present embodiment, is providing Updated PIM Data 520 to the data aggregation server 500. More specifically, the Old Personal PIM Data Profile 550 of User A's device 510 is being replaced by Updated Personal PIM Data Profile 560 to reflect the introduction of Updated PIM Data 520.

User B's device 530 also subscribes to the data aggregation and publication service offered by data aggregation server 500. As the result of a link having been established between User A and User B (e.g., by specific request as in step 460 of FIG. 4; through the identification of matching PIM data in step 440 of FIG. 4; or through targeted linking as in step 470 of FIG. 4), User B will have access to Received Updated PIM Data 540 via the data aggregation server 500. As a result of the link, User B will not have to manually update a contact profile for User A as the data aggregation server 500 automatically updates User B's profiles and provides an Updated Contact Profile 570 that reflects Updated PIM Data 520 provided by User A and subsequently received by User B as Received Updated PIM Data 540. Updating of profiles in this manner can be subject to any number of security limitations as well as timing limitations (e.g., pushing Updated PIM Data 520 to an account by User A, that data subsequently pulled from the account by User B) as have been previously described in the present disclosure.

Figure 6:
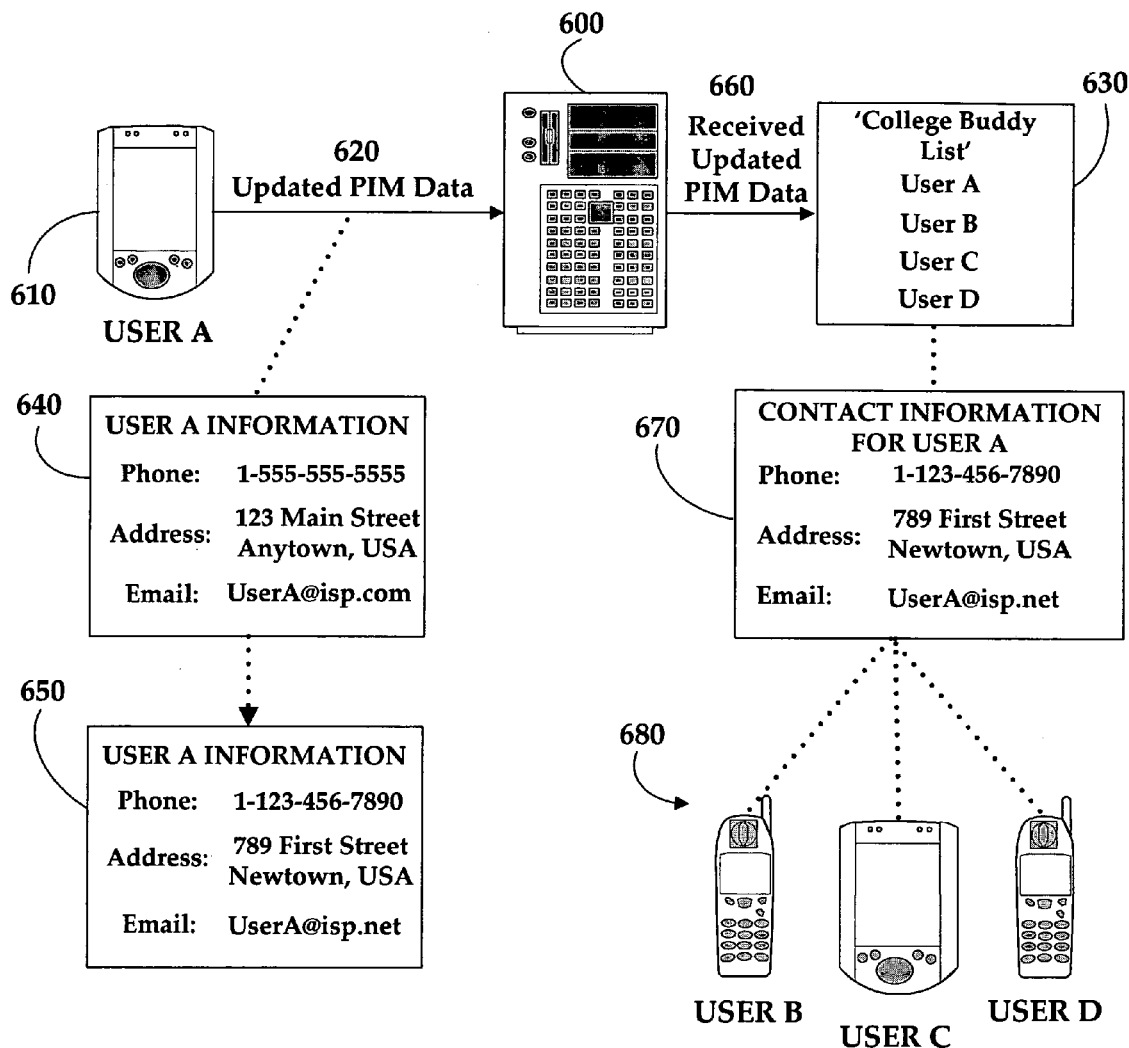
FIG. 6 illustrates a linking functionality providing updated PIM data amongst a group of users in a data aggregation and publication network.

FIG. 6 illustrates a linking functionality providing updated PIM data amongst a group of users of a data aggregation and publication service. User A 610 provides Updated PIM Data 620 to the data aggregation server 600 similar to that described in FIG. 5. The embodiment depicted in FIG. 6, however, introduces a Group Profile 630. In the present example, Group Profile 630 happens to be a list of college buddies. Group Profile 630 can encompass any combination of users: work colleagues, family members, members of a fan club or enthusiast group, friends from college, neighbors and so on. A Group Profile 630 is often established by, or in conjunction with, a groups module like that discussed in the context of FIG. 1 (150). While a Group Profile 630 may have a common theme that ties all the members of the group together (e.g., they are all family members or they all went to college together), the profile can also be a conglomerate listing of identities with no commonalities (e.g., all users in a contacts listing).

Group Profile 630 often serves as a simple means for contacting all persons of that particular group at once. For example, instead of a user manually entering three separate e-mail addresses for Users B, C and D when User A wishes to send all of his 'college buddies' an e-mail message, User A, via device 610, will instead send an e-mail message to an entry designated as 'College Buddies' wherein an e-mail client in his communications device will extract the relevant e-mail addresses for Users B, C and D from a contacts list and then send the e-mail to Users B, C and D. Similar advantages exist with regard to SMS communications or providing access to or delivering content such as still image, video and audio files in addition to blog entries and other forms of content and data.

Group Profile 630 may also be used as a simple means as quickly reviewing contact information for particular persons. For example, User B's contact information may encompass a long list of contact entries. Instead of scrolling through those numerous entries, User A may instead access the Group Profile 630 for his 'college buddies' and quickly access the specific contact information for User B.

Returning to FIG. 6, User A may provide Updated PIM Data 620 as was mentioned in reference to FIG. 5. User A's updating of this PIM data will cause User A's Old Personal PIM Data Profile 640 to become updated and as is reflected in Updated Personal PIM Data Profile 650. This Updated Personal PIM Data Profile 650 is received by the data aggregation server 600 and subsequently distributed as Received Updated PIM Data 660. Distribution may occur as described in FIG. 4 (e.g., by specific request as in step 460; through the identification of matching PIM data in step 440; or through targeted linking as in step 470). Additionally, distribution and/or linking may occur via Group Profile 630. In this way, in a targeted link (step 470 of FIG. 4), User A 610 may provide his Updated PIM Data 620 and target its delivery to the members of Group Profile 630. In this way, an Updated Contact Profile 670 for User A will be generated for all the Group Members of the Group Profile 630 'college buddies.'

In the same way that Group Members' devices 680 each receive an Updated Contact Profile 670 for User A, a similar methodology may be utilized to introduce new members to a Group Profile 630. For example, if User E (not shown) is added to Group Profile 630, he could receive not only the Updated Contact Profile 670 for User A but also immediately receive all authorized PIM Data related to members of the Group Profile 630. User E could have no PIM data relating to User A, B, C or D when enrolling with the data aggregation and publication service but immediately upon being linked (either automatically, by request or by invitation) to Group Profile 630, he could receive all PIM Data relevant to Users A, B, C and D and, dependent upon certain security settings, all the PIM Data possessed by Users A, B, C and D. That is, upon enrollment and linking, User E's PIM Data of other users could change from zero entries to every entry otherwise possessed by Users A, B, C and D.

The establishment of links may also be used to update PIM data that is incomplete amongst various users as was mentioned in the course of FIG. 1. For example, one user may have incomplete PIM data for a particular person (e.g., name and address but no phone number). Through the establishment of a link with another user, the user with an incomplete entry may obtain the missing phone number from the second user who has a more complete entry. This link may be by request or automated as was discussed in the context of FIG. 4.

While the present invention has been described in connection with a series of preferred embodiments, these descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. In that regard, the Applicants specifically note that the distribution and sharing of PIM data may also encompass other forms of data, including calendar data, to do list data, notepad data or any other data traditionally associated with a PDA in addition to particularized content such as photos (e.g., JPEG files), blog entries, video (e.g., MPEG files) or audio (e.g., MP3s). Linking may also provide other features available only for linked users that expand beyond PIM data updates; for example, sending and receipt of voice messages, instant messaging and blog access.

What is claimed is:

1. A system for sharing Personal Information Management (PIM) data comprising:
   a first computing device configured to provide PIM data;
   a second computing device configured to receive PIM data;
   an intermediate computing device coupling the first computing device to the second computing device, the intermediate computing device configured to:
   host a user profile associated with a user of the first computing device and a user profile associated with a user of the second computing device,
   identify a common relationship between the user profiles, wherein identification of the relationship includes identification of information common to both the user profiles, and
   overwrite out-of-date PIM data at one of the two computing devices, whereby the overwritten PIM data will correspond to up-to-date PIM data at the other of the two computing devices when the intermediate computing device identifies the information common to both the user profiles, wherein overwriting out-of-date PIM data includes changing one or more values of the out-of-date PIM data at the one of the two computing devices when the one or more values differ between the user profiles and populating one or more values when the one or more values is unpopulated for the out-of-date PIM data at the one of the two computing devices.

2. The system of claim 1, wherein the intermediate computing device is a data aggregation server implemented by a network service provider.

3. The system of claim 1, wherein the user profile of at least one of the first computing device and second computing device comprises e-mail PIM data.

4. The system of claim 1, wherein the user profile of at least one of the first computing device and second computing device comprises name PIM data.

5. The system of claim 1, wherein the user profile of at least one of the first computing device and second computing device comprises phone PIM data.

6. The system of claim 1, wherein the first computing device pushes PIM data to the intermediate computing device.

7. The system of claim 6, wherein the PIM data from the first computing device is pushed to the second computing device by the intermediate computing device.

8. The system of claim 6, wherein the PIM data from the first computing device is pulled from the intermediate computing device by the second computing device.

9. The system of claim 1, wherein the intermediate computing device pulls PIM data from the first computing device.

10. The system of claim 9, wherein the PIM data from the first computing device is pushed to the second computing device by the intermediate computing device.

11. The system of claim 9, wherein the PIM data from the first computing device is pulled from the intermediate computing device by the second computing device.

12. The system of claim 7, wherein the user of the first computing device identifies the user of the second computing device and causes the first computing device to push the PIM data to the second computing device via the intermediate computing device.

13. The system of claim 11, wherein the user of the second computing device identifies the user of the first computing device and causes the second computing device to pull the PIM data from the first computing device via the intermediate computing device.

14. A method for updating Personal Information Management (PIM) data amongst a plurality of users, comprising:
   providing a first set of PIM data, the first set of PIM data including up-to-date PIM data;
   providing a second set of PIM data, the second set of PIM data including out-of-date PIM data;
   establishing a link between a user of the first set of PIM data and a user of the second set of PIM data, wherein the link between the user of the first set of PIM data and the user of the second set of PIM data is established as a result of information in the first set of PIM data also being in the second set of PIM data;

causing the second set of PIM data to correspond to the first set of PIM data such that the out-of-date PIM data is overwritten by the up-to-date PIM data, wherein causing the second set of PIM data to correspond to the first set of PIM data is subject to security limitations on updating PIM data imposed by the user of the first or second set of PIM data, and wherein overwriting the out-of-date PIM data includes changing one or more values of the out-of-date PIM data when the one or more values differ between the first set of PIM data and second set of PIM data and populating one or more values into the second set of PIM data when the one or more values is unpopulated for the second set of PIM data.

15. A method for updating Personal Information Management (PIM) data amongst a plurality of users, comprising:

providing a first set of PIM data, the first set of PIM data including up-to-date PIM data;

providing a second set of PIM data, the second set of PIM data including out-of-date PIM data;

establishing a link between a user of the first set of PIM data and a user of the second set of PIM data, wherein the link between the user of the first set of PIM data and the user of the second set of PIM data is established as a result of a data aggregation server identifying a correlation between the user of the first set of PIM data and the user of the second set of PIM data, the correlation based at least in part on information common to the first set of PIM data and the second set of PIM data;

causing the second set of PIM data to correspond to the first set of PIM data such that the out-of-date PIM data is overwritten by the up-to-date PIM data, wherein causing the second set of PIM data to correspond to the first set of PIM data is subject to security limitations on updating PIM data imposed by the user of the first or second set of PIM data, and wherein overwriting the out-of-date PIM data includes changing one or more values of the out-of-date PIM data when the one or more values differ between the first set of PIM data and second set of PIM data and populating one or more values into the second set of PIM data when the one or more values is unpopulated for the second set of PIM data.

16. A method for updating Personal Information Management (PIM) data amongst a plurality of users, comprising:

providing a first set of PIM data, the first set of PIM data including up-to-date PIM data;

providing a second set of PIM data, the second set of PIM data including out-of-date PIM data;

establishing a link between a user of the first set of PIM data and a user of the second set of PIM data, wherein the link between the user of the first set of PIM data and the user of the second set of PIM data is established as a result of the user of information in the second set of PIM data also being in the first set of PIM data;

causing the second set of PIM data to correspond to the first set of PIM data such that the out-of-date PIM data is overwritten by the up-to-date PIM data, wherein causing the second set of PIM data to correspond to the first set of PIM data is subject to security limitations on updating PIM data imposed by the user of the first or second set of PIM data, and wherein overwriting the out-of-date PIM data includes changing one or more values of the out-of-date PIM data when the one or more values differ between the first set of PIM data and second set of PIM data and populating one or more values into the second set of PIM data when the one or more values is unpopulated for the second set of PIM data.

17. A method for completing Personal Information Management (PIM) data entries amongst a plurality of users, comprising:

providing a first set of PIM data, the first set of PIM data including an incomplete user contact profile;

providing a second set of PIM data, the second set of PIM data including at least one PIM data entry not present in the user contact profile of the first set of PIM data;

identifying the presence of the second set of PIM data including the at least one PIM data entry not present in the user contact profile of the first set of PIM data;

establishing a link between a user of the first set of PIM data and a user of the second set of PIM data, the link based at least in part on information in the first set of PIM data also being in the second set of PIM data;

updating the first set of PIM data in accordance with a security limitation imposed by a user of the first set of PIM data such that the user contact profile comprises at least the one PIM data entry of the second set of PIM data, and wherein updating the first set of PIM data includes changing one or more entries in the first set of PIM data based at least in part on one or more corresponding entries in the second set of PIM data when the one or more entries differ from the one or more corresponding entries.

18. The method of claim 17, wherein the link between the user of the first set of PIM data and the user of the second set of PIM data is established as a result of the user of the first set of PIM data requesting the at least one PIM data entry from the user of the second set of PIM data.

19. The method of claim 17, wherein the link between the user of the first set of PIM data and the user of the second set of PIM data is established as a result of a data aggregation server identifying the at least one PIM data entry not present in the user contact profile of the first set of PIM data.

20. The method of claim 14, wherein the information in both the first set of PIM data and the second set of PIM data corresponds to a set of which the user of the first set of PIM data and the user of the second set of PIM data are members.

21. The method of claim 20, wherein the set of which the user of the first set of PIM data and the user of the second set of PIM data are members corresponds to an organization.

22. The method of claim 20, wherein the set of which the user of the first set of PIM data and the user of the second set of PIM data are members corresponds to a geographic area.

23. The method of claim 14, wherein the information in both the first set of PIM data and the second set of PIM data corresponds to a particular user.

24. The method of claim 22, wherein the particular user is one of the user of the first set of PIM data and the user of the second set of PIM data.

25. The method of claim 15, wherein the information common to the first set of PIM data and the second set of PIM data corresponds to a set of which the user of the first set of PIM data and the user of the second set of PIM data are members.

26. The method of claim 25, wherein the set of which the user of the first set of PIM data and the user of the second set of PIM data are members corresponds to an organization.

27. The method of claim 25, wherein the set of which the user of the first set of PIM data and the user of the second set of PIM data are members corresponds to a geographic area.

28. The method of claim 15, wherein the information common to the first set of PIM data and the second set of PIM data corresponds to a particular user.

29. The method of claim 28, wherein the particular user is one of the user of the first set of PIM data and the user of the second set of PIM data.

30. The method of claim 16, wherein the information in both the first set of PIM data and the second set of PIM data corresponds to a set of which the user of the first set of PIM data and the user of the second set of PIM data are members.

31. The method of claim 30, wherein the set of which the user of the first set of PIM data and the user of the second set of PIM data are members corresponds to an organization.

32. The method of claim 30, wherein the set of which the user of the first set of PIM data and the user of the second set of PIM data are members corresponds to a geographic area.

33. The method of claim 16, wherein the information in both the first set of PIM data and the second set of PIM data corresponds to a particular user.

34. The method of claim 33, wherein the particular user is one of the user of the first set of PIM data and the user of the second set of PIM data.

* * * * *

UNITED STATES PATENT AND TRADEMARK OFFICE
CERTIFICATE OF CORRECTION

| | | |
|---|---|---|
| PATENT NO. | : 7,917,468 B2 | Page 1 of 1 |
| APPLICATION NO. | : 11/229340 | |
| DATED | : March 29, 2011 | |
| INVENTOR(S) | : Ido Ariel et al. | |

It is certified that error appears in the above-identified patent and that said Letters Patent is hereby corrected as shown below:

In column 23, line 55, in Claim 16, delete "user of" and insert -- user --, therefor.

Signed and Sealed this
Ninth Day of August, 2011

David J. Kappos
*Director of the United States Patent and Trademark Office*